US005751622A

United States Patent [19]
Purcell

[11] Patent Number: 5,751,622
[45] Date of Patent: May 12, 1998

[54] STRUCTURE AND METHOD FOR SIGNED MULTIPLICATION USING LARGE MULTIPLIER HAVING TWO EMBEDDED SIGNED MULTIPLIERS

[75] Inventor: Stephen C. Purcell, Mountain View, Calif.

[73] Assignee: Chromatic Research, Inc., Mountain View, Calif.

[21] Appl. No.: 541,563

[22] Filed: Oct. 10, 1995

[51] Int. Cl.[6] .................................................. G06F 7/52
[52] U.S. Cl. ........................................................ 364/757
[58] Field of Search ................................ 364/757, 758, 364/754, 754.01

[56] References Cited

U.S. PATENT DOCUMENTS

| | | | |
|---|---|---|---|
| 4,130,877 | 12/1978 | Riekers | 364/758 |
| 4,130,878 | 12/1978 | Balph et al. | 364/758 |
| 4,825,401 | 4/1989 | Ikumi | 364/757 |

Primary Examiner—David H. Malzahn
Attorney, Agent, or Firm—Skjerven, Morrill, MacPherson, Franklin & Friel; Edward C. Kwok

[57] ABSTRACT

A signed multiplier circuit which performs selectable multiplication operations on a first word having an upper byte and a lower byte and a second word having an upper byte and a lower byte. A first multiplier means generates a first product representative of the product of the upper bytes of the first and second words and the product of the lower bytes of the first and second words. A second multiplier means generates a second product representative of the product of the upper byte of the first word and the lower byte of the second word plus the product of the lower byte of the first word and the upper byte of the second word. The second multiplier means can be selectively disabled. When the second multiplier means is enabled, the multiplier circuit multiplies the first and second words. When the second multiplier means is disabled, the multiplier circuit multiplies the upper bytes of the first and second words and the lower bytes of the first and second words.

13 Claims, 19 Drawing Sheets

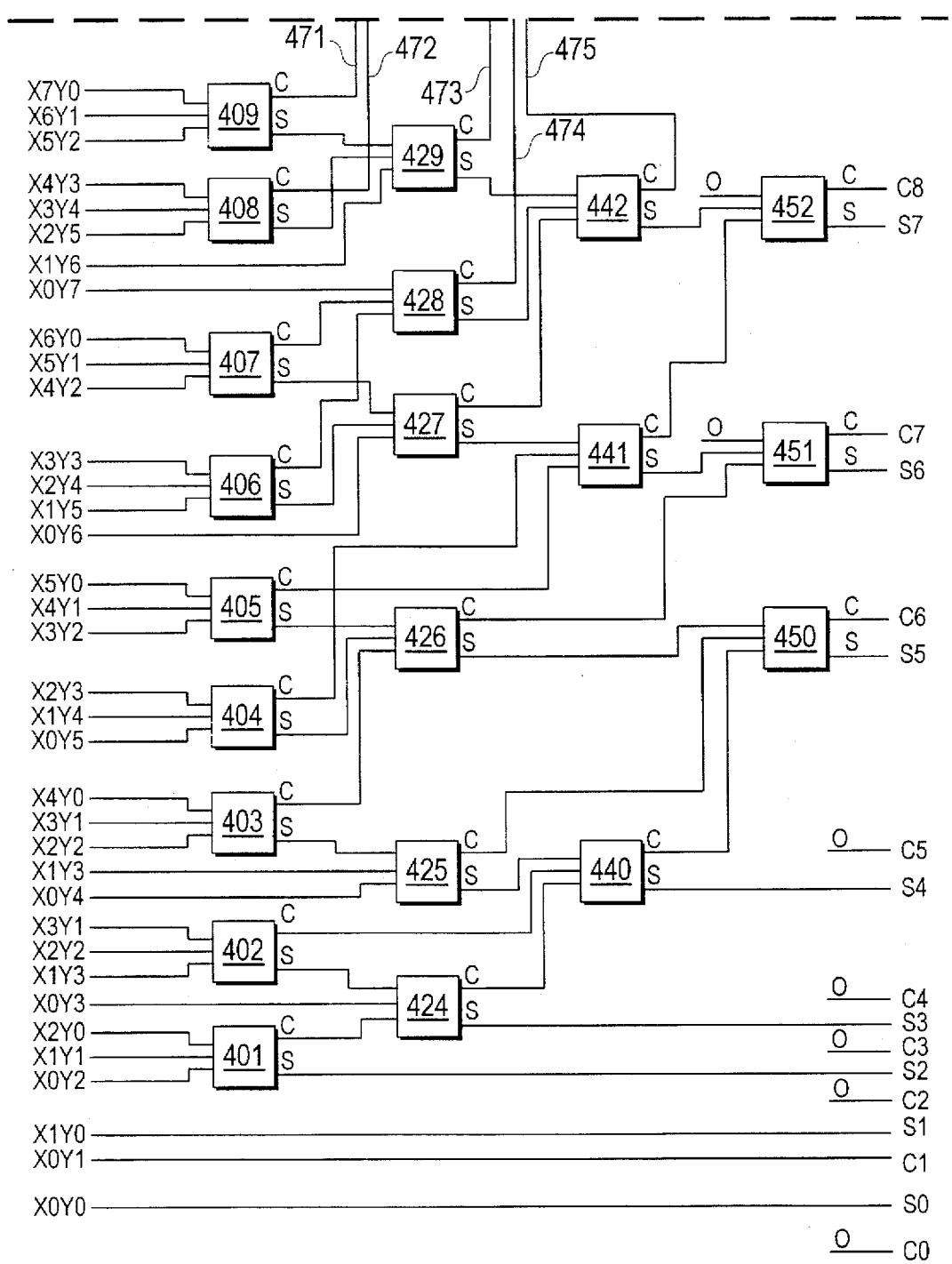
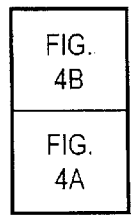
FIG. 4B

| X | Y | Z | S | C |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

| $b_2$ | $b_0$ | $b_1$ | S | T | N |
|---|---|---|---|---|---|
| 0 | 0 | 0 | 0 | 0 | 0 |
| 0 | 0 | 1 | 1 | 0 | 0 |
| 0 | 1 | 0 | 1 | 0 | 0 |
| 0 | 1 | 1 | 0 | 1 | 0 |
| 1 | 0 | 0 | 0 | 1 | 1 |
| 1 | 0 | 1 | 1 | 0 | 1 |
| 1 | 1 | 0 | 1 | 0 | 1 |
| 1 | 1 | 1 | 0 | 0 | 0 |

STRUCTURE AND METHOD FOR SIGNED MULTIPLICATION USING LARGE MULTIPLIER HAVING TWO EMBEDDED SIGNED MULTIPLIERS

CROSS REFERENCE TO RELATED APPLICATIONS

This application is related to commonly-owned U.S. patent application Ser. No. 08/285,376 entitled "STRUCTURE AND METHOD FOR EMBEDDING TWO SMALL MULTIPLIERS IN A LARGER MULTIPLIER", filed on Aug. 3, 1994 now U.S. Pat. No. 5,586,070.

1. Field of the Invention

The present invention relates to a multiplier for use in an integrated circuit. In particular, the present invention relates to a structure and method for creating a multiplier which can be selected to perform either a single large signed multiplication or two smaller signed multiplications.

2. Background of the Invention

FIG. 1 is a block diagram illustrating a conventional multiplier circuit 100 which performs one 18-bit multiplication or two 9-bit multiplications. Multiplier circuit 100 includes input ports 101 and 102, 18-bit multiplier 110, 9-bit multipliers 120 and 121, multiplexer 130 and output port 103. Eighteen-bit words A[17:0] and B[17:0] are provided to multiplier circuit 100 at input ports 101 and 102, respectively. Eighteen-bit word A[17:0] consists of a 9-bit upper byte A[17:9] and a 9-bit lower byte A[8:0]. Similarly, 18-bit word B[17:0] consists of a 9-bit upper byte B[17:9] and a 9-bit lower byte B[8:0].

To perform an 18-bit multiplication, 18-bit words A[17:0] and B[17:0] are provided to 18-bit multiplier 110. 18-bit multiplier 110 is a conventional device which contains at least four 9-bit multipliers similar to 9-bit multipliers 120 and 121. The output signal of 18-bit multiplier 110 is a 36-bit (in parallel) word output signal which is equal to the product of A[17:0] and B[17:0]. A multiplexer select signal on lead 131 causes multiplexer 130 to route the 36 output bits of 18-bit multiplier 110 to output port 103.

Multiplier circuit 100 is also capable of performing two 9-bit multiplications. To do this, 9-bit upper byte A[17:9] is multiplied by 9-bit upper byte B[17:9] to form a first 18-bit product and 9-bit lower byte A[8:0] is multiplied by 9-bit lower byte B[8:0] to form a second 18-bit product. Thus, 18-bit word A[17:0] is separated into two 9-bit bytes A[17:9] and A[8:0] at port 150. Nine-bit byte A[17:9] is provided to an input bus of multiplier 120 and 9-bit byte A[8:0] is provided to an input bus of multiplier 121. Similarly, 18-bit word B[17:0] is separated into two 9-bit bytes B[17:9] and B[8:0] at port 151. Nine-bit byte B[17:9] is provided to an input bus of multiplier 120 and 9-bit byte B[8:0] is provided to an input bus of multiplier circuit 121.

Nine-bit multiplier 120 is a conventional multiplier circuit which produces an 18-bit word equal to A[17:9]*B[17:9]. Nine-bit multiplier 121 is typically identical to 9-bit multiplier 120. Thus, the output signal of 9-bit multiplier 121 is equal to A[8:0]*B[8:0]. The output signals of multipliers 120 and 121 are concatenated at port 152, resulting in a 36-bit output signal. The upper half of this 36-bit output signal is equal to the product of A[17:9] and B[17:9] and the lower half of this 36-bit output signal is equal to the product of A[8:0] and B[8:0]. Consequently, the two 9-bit multiplications previously described have been performed. A multiplexer select signal on lead 131 causes multiplexer 130 to route the 36-bit output signal of concatenation port 152 to output port 103.

Because multiplier circuit 100 requires an 18-bit multiplier 110, two 9-bit multipliers 120 and 121, and multiplexer 130, the area required to fabricate multiplier circuit 100 is significant. Because of the desire to minimize the layout area of integrated circuits, it would be advantageous to have a multiplier circuit with a reduced area which is capable of selectably performing either a large multiplication or two small multiplications.

SUMMARY

In accordance with the present invention, first and second words each having an upper and a lower byte are provided to respective first and second input ports of a multiplier circuit. The multiplier circuit can be selected to multiply the first and second words in a first mode. The multiplier circuit can also be selected to multiply the upper bytes of the first and second words and the lower bytes of the first and second words in a second mode.

In one embodiment, the multiplier circuit has four multipliers. In the first mode, all four multipliers are used to multiply the first and second words. In the second mode, two of the four multipliers are effectively disabled by a multiplier select signal and the remaining two multipliers are used to multiply the upper bytes of the first and second words and the lower bytes of the first and second words.

In one embodiment of the present invention, a first multiplier is coupled to the first and second input ports in such a manner as to receive the upper bytes of the first and second words. In response, the first multiplier circuit generates a first product equal to the product of these upper bytes.

A second multiplier is coupled to the first and second input ports in such a manner as to receive the lower bytes of the first and second words. In response, the second multiplier circuit generates a second product equal to the product of these lower bytes.

A third multiplier is coupled to the second input port and a first gating circuit in such a manner as to receive the lower byte of the second word and the output signal of the first gating circuit. In response, the third multiplier circuit generates a third product equal to the product of the lower byte of the second word and the output signal of the first gating circuit.

A fourth multiplier is coupled to the second input port and a second gating circuit in such a manner as to receive the upper byte of the second word and the output signal of the second gating circuit. In response, the fourth multiplier circuit generates a fourth product equal to the product of the upper byte of the second word and the output signal of the second gating circuit.

The first gating circuit is coupled to the first input port in such a manner as to receive the upper byte of the first word and the multiplier select signal. The second gating circuit is coupled to the first input port in such a manner to receive the lower byte of the first word and the multiplier select signal. The multiplier select signal determines whether the first and second gating circuits pass the upper and lower bytes of the first word, respectively, or zero values.

When the multiplier select signal is in a first state, the first mode of the multiplier circuit is selected and the first and second gating circuits pass the upper and lower bytes of the first word, respectively.

When the multiplier select signal is in a second state, the second mode of the multiplier circuit is selected and the output signals of the first and second gating circuits are zero.

Another embodiment of the present invention includes a method of selectably multiplying a first word having an upper byte and a lower byte and a second word having an upper byte and a lower byte. The upper byte of the first word is multiplied with the upper byte of the second word to create a first product. The lower byte of the first word is multiplied with the lower byte of the second word to create a second product. The first and second products are then concatenated to form a first concatenated word.

The lower byte of the first word is multiplied with a selectable signal to create a first byte and the upper byte of the first word is multiplied with the selectable signal to create a second byte. The first byte is multiplied with the upper byte of the second word to create a third product and the second byte is multiplied with the lower byte of the second word to create a fourth product. The third and fourth products are then added to create a first sum.

The selectable signal is selected to be one to perform the multiplication of the two words. The selectable signal is selected to be zero to perform the multiplication of the upper bytes of the first and second words and the multiplication of the lower bytes of the first and second words.

The present invention will be more fully understood in view of the following drawings taken together with the detailed description.

BRIEF DESCRIPTION OF THE DRAWINGS

FIG. 3 is a schematic diagram illustrating longhand multiplication of two 9-bit numbers to obtain an 18-bit product;

FIGS. 4a and 4b are a schematic diagram of a conventional 9-bit Wallace tree adder;

DETAILED DESCRIPTION OF THE INVENTION

Figure 2:
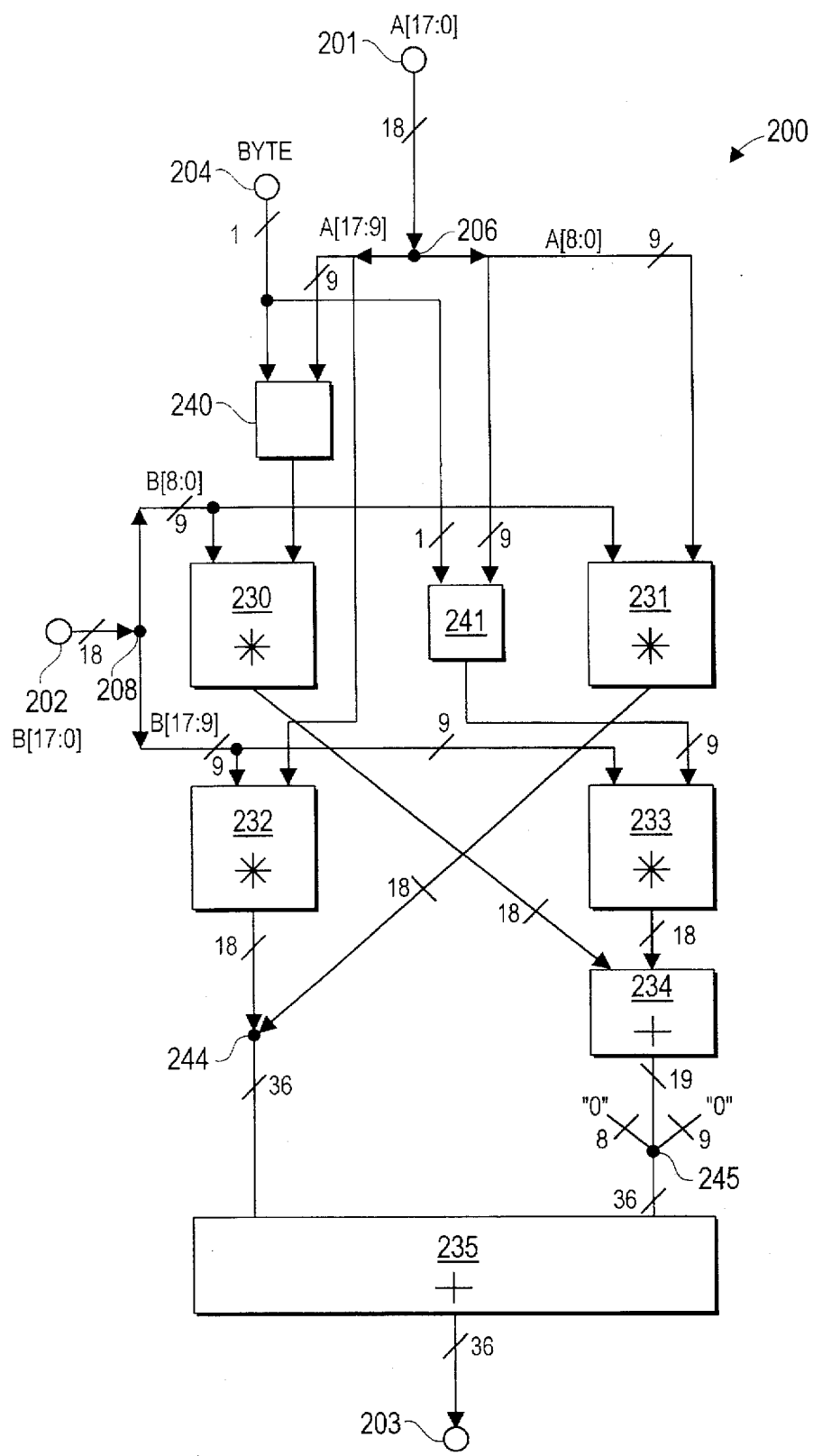
FIG. 2 is a block diagram of a multiplier circuit in accordance with the present invention.

FIG. 2 is a block diagram of multiplier circuit 200 in accordance with one embodiment of the present invention. Although the present invention is described in connection with circuitry which performs either an 18-bit multiplication or two 9-bit multiplications, the present invention is easily modified to perform multiplications with other numbers of bits.

The multiplication of two 18-bit words A[17:0] and B[17:0] to create a 36-bit output signal C[35:0] can be defined in the following long-hand form.

|  |  | A[17:9] | A[8:0] |
|---|---|---|---|
| * |  | B[17:9] | B[8:0] |
|  |  | A[17:9]*B[8:0] | A[8:0]*B[8:0] |
|  | A[17:9]*B[17:9] | A[8:0]*B[17:9] |  |

A[17:9]*B[17:9] + (A[17:9]*B[8:0] + A[8:0]*B[17:9]) + A[8:0]*B[8:0]

$*2^{18}$     $*2^9$     $*2^0$

Thus, four 9-bit multiplications are performed to create four 18-bit products, A[17:9]*B[8:0], A[8:0]*B[8:0], A[17:9]*B[17:9] and A[8:0]*B[17:9]. As indicated in the above equation, 18-bit product A[8:0]*B[8:0] contributes to the value of the lower 18-bits C[17:0] of the resultant 36-bit product (i.e., product A[8:0]*B[8:0] is multiplied by $2^0$). Similarly, the 18-bit product A[17:9]*B[17:9] contributes to the value of the upper 18-bits C[35:18] of the resultant 36-bit product (i.e., product A[17:9]*B[17:9] is multiplied by $2^{18}$). Finally, the sum of 18-bit products A[17:9]*B[8:0] and A[8:0]*B[17:9] contribute to the value of the middle 19-bits C[27:9] of the resultant 36-bit product (i.e., A[17:9]*B[8:0] +A[8:0]*B[17:9] is multiplied by $2^9$).

Multiplier circuit 200 performs the above-described 18-bit multiplication as follows. Eighteen-bit word A[17:0] is provided to input port 201 and is divided into two 9-bit bytes A[17:9] and A[8:0] at port 206. Nine-bit upper byte A[17:9] is provided to an input bus of gating circuit 240 and to an input bus of 9-bit multiplier 232. Nine-bit lower byte A[8:0] is provided to an input bus of gating circuit 241 and an input bus of 9-bit multiplier 231. In one embodiment, 9-bit multipliers 230 and 231 utilize conventional Wallace tree adders.

Figure 3:
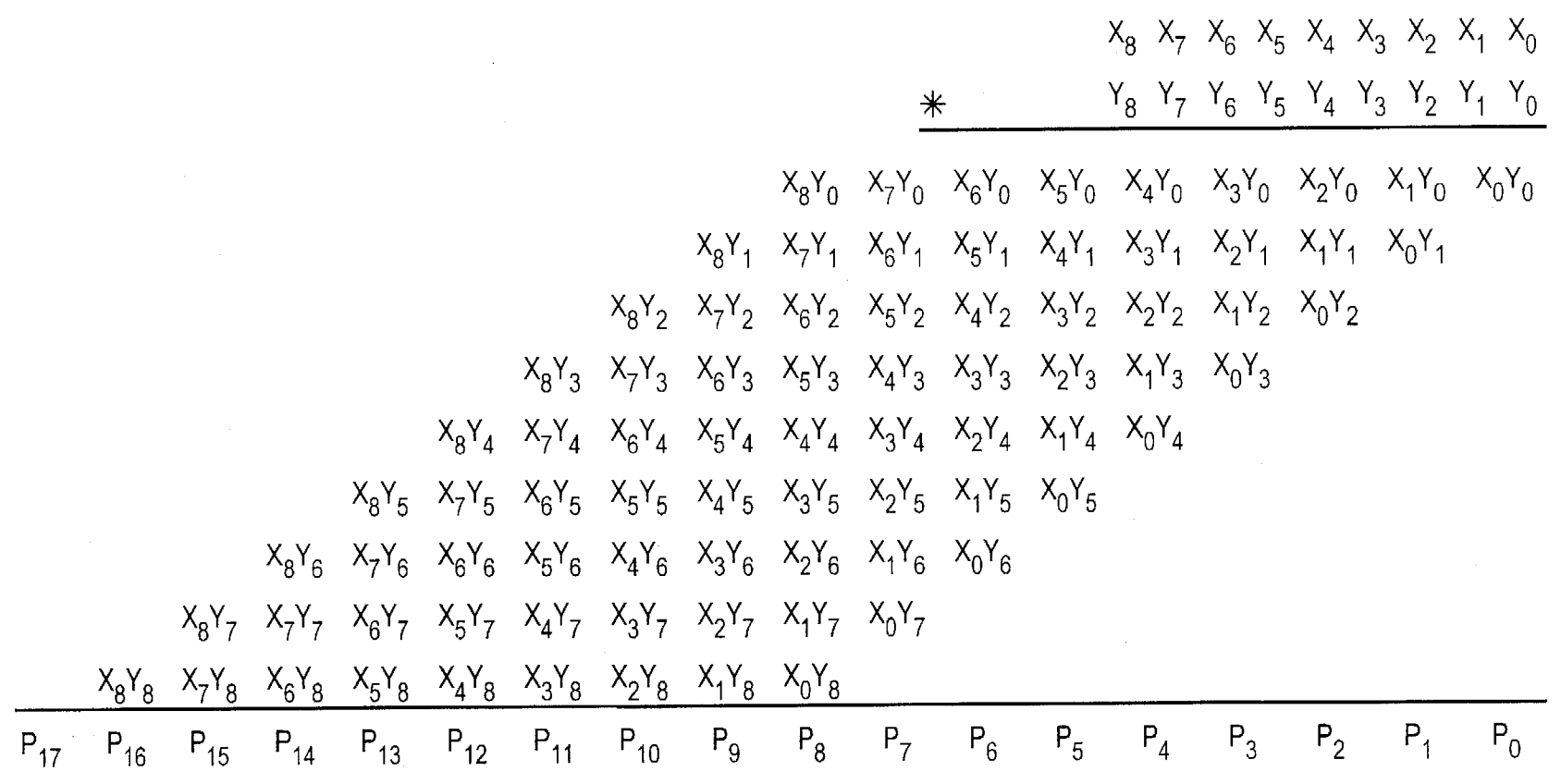
Figure 4A:
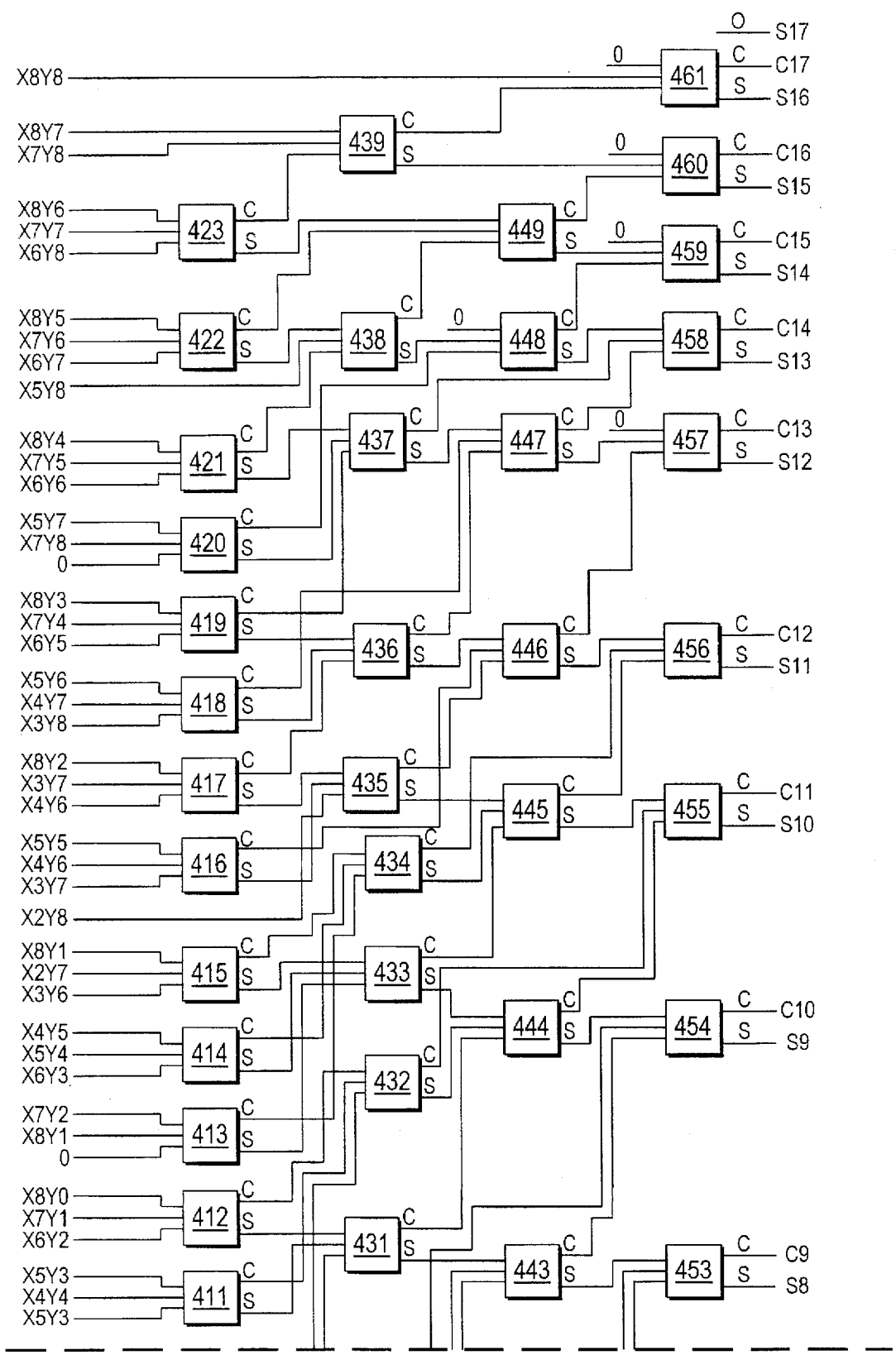
Figures 5A, 5B:
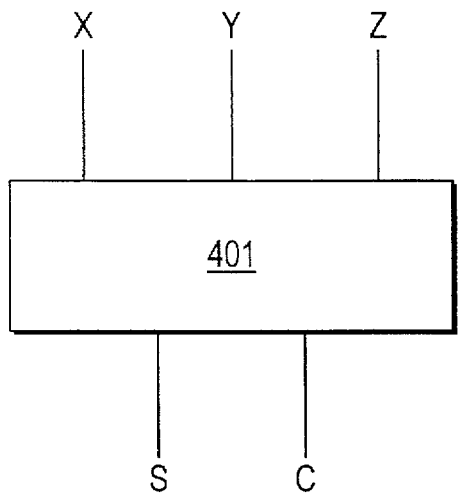
FIG. 5a is a schematic diagram of a carry save adder.
FIG. 5b is a truth table for the carry save adder of FIG. 5b.

FIG. 3 is a schematic diagram illustrating a longhand multiplication of two 9-bit numbers X[8:0] and Y[8:0] to obtain 18-bit product P[17:0]. FIG. 4 is a schematic diagram of a conventional 9-bit Wallace tree adder 400 which can be used to multiply 9-bit numbers X[8:0] and Y[8:0]. FIG. 4 consists of FIGS. 4a and 4b. Leads 471–475 couple FIGS. 4a and 4b as illustrated. Carry save adders 401–461 of Wallace tree adder 400 are used to create sum bits S[17:0] and carry bits C[17:0]. Sum bits S[17:0] and carry bits C[17:0] are added in a carry propagate adder (not shown) to create product P[17:0] (FIG. 3). FIG. 5a is a schematic diagram of carry save adder 401 and FIG. 5b is a truth table for carry save adder 401. Carry save adders 402–461 are identical to carry save adder 401.

Returning now to FIG. 2, a 1-bit BYTE select signal is provided at port 204. This BYTE select signal is typically generated in response to a system operation code and is routed to input leads of gating circuits 240 and 241. As described in more detail later, the BYTE select signal determines whether multiplier circuit 200 operates as an 18-bit multiplier or two 9-bit multipliers. The output signals of gating circuits 240 and 241 are provided to input buses of 9-bit multipliers 230 and 233, respectively.

An 18-bit word B[17:0] is provided to input port 202. Eighteen-bit word B[17:0] is separated into 9-bit upper byte B[17:9] and 9-bit lower byte B[8:0] at port 208. Lower byte B[8:0] is provided to input buses of 9-bit multipliers 230 and 231 and upper byte B[17:9] is provided to input buses of 9-bit multipliers 232 and 233. In one embodiment, 9-bit multipliers 232 and 233 are identical to 9-bit multipliers 230 and 231.

The output signals of multipliers 231 and 232 are provided to concatenation port 244. The output signal of concatenation port 244 is provided to summing circuit 235.

The output signals of multipliers 230 and 233 are provided to summing circuit 234. The output signal of summing circuit 234 is transmitted through concatenation port 245 to summing circuit 235. The output signal of summing circuit 235 is provided to output port 203.

Figure 6:
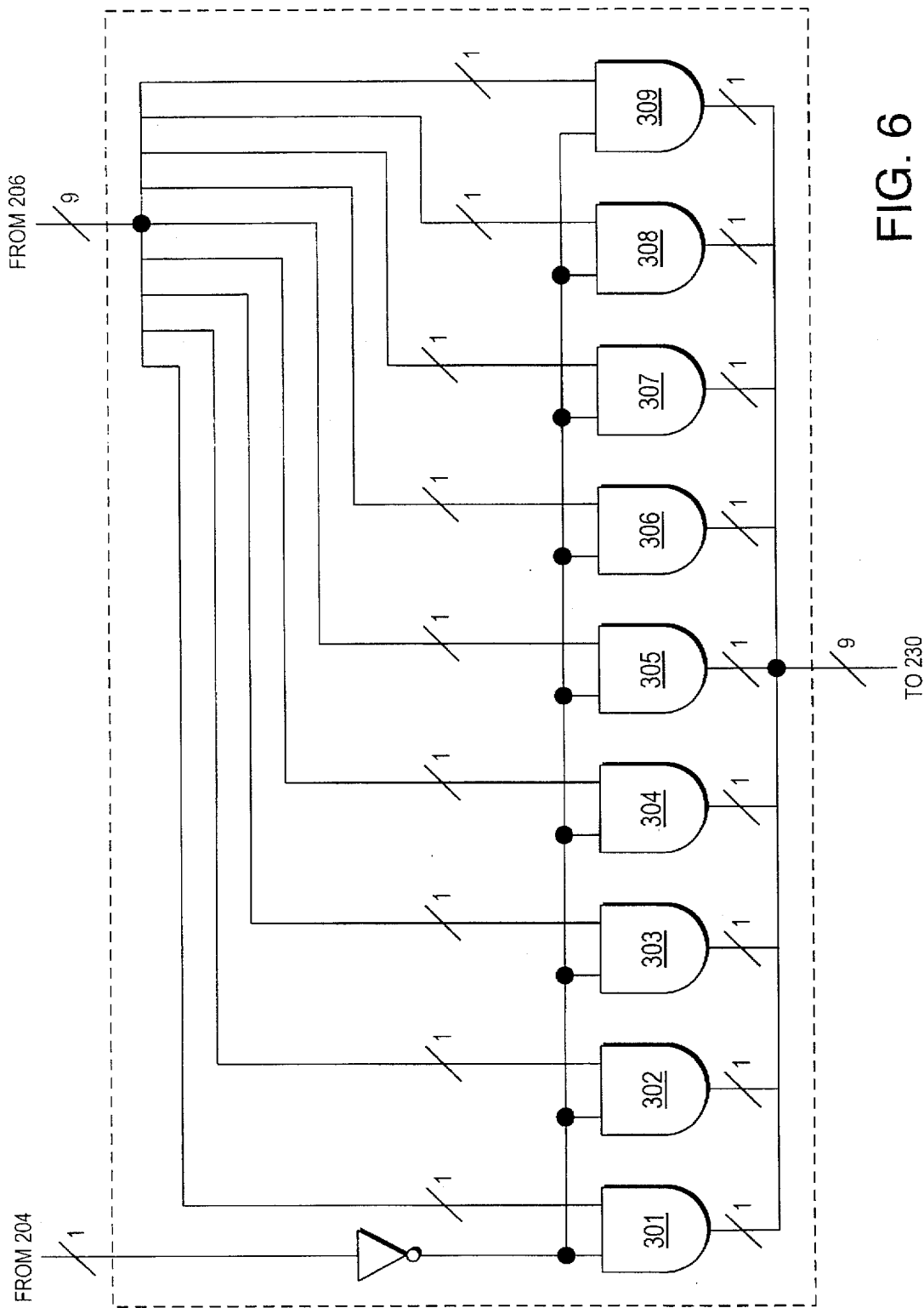
FIG. 6 is a schematic diagram of a gating circuit in accordance with one embodiment of the present invention.

Multiplier circuit 200 operates as follows. To perform an 18-bit multiply, the BYTE select signal at input port 204 is set to a logic low level, thereby providing a low signal to gating circuit 240. FIG. 6 is a schematic diagram of one embodiment of gating circuit 240. The inverted BYTE select signal is provided to an input lead of each of AND gates 301–309. Each bit of byte A[17:9] is applied to an input lead of one of AND gates 301–309. Gating circuit 240 thereby performs a logical AND operation on each of the bits in upper byte A[17:9]. The low input signal from input port 204 causes upper byte A[17:9] to be transmitted through gating circuit 240 to an input bus of multiplier 230. Although gating circuit 240 is described in connection with a single embodiment, it is understood that other gating circuits can be substituted for gating circuit 240 without departing from the scope of the present invention.

In one embodiment of the present invention, gating circuit 241 is formed in the same manner as gating circuit 240. Thus, the low input signal at input port 204 causes lower byte A[8:0] to be transmitted through gating circuit 241 to an input bus of multiplier 233.

As a result, the output signal of multiplier 230 is an 18-bit product equal to A[17:9]*B[8:0], the output signal of multiplier 231 is an 18-bit product equal to A[8:0]*B[8:0], the output signal of multiplier 232 is an 18-bit product equal to A[17:9]*B[17:9], and the output signal of multiplier 233 is an 18-bit product equal to A[8:0]*B[17:9].

The output signals of multipliers 231 and 232 are concatenated at port 244 to produce a 36-bit output signal. The upper 18-bits of this output signal are equal to the 18-bit product A[17:9]*B[17:9] and the lower 18-bits of this output signal are equal to the 18-bit product A[8:0]*B[8:0]. The output signal of concatenation port 244 is therefore equal to:

$$A[17:9]*B[17:9]*2^{18}+A[8:0]*B[8:0]*2^{0}.$$

The output signals of multipliers 230 and 233 are added in summing circuit 234. Thus, the output signal of summing circuit 234 is equal to:

$$A[17:9]*B[8:0]+A[8:0]*B[17:9].$$

The output signal of summing circuit 234 has 19-bits to include any carry bit required by the addition of the two 18-bit input words. The 19-bit output signal of summing circuit 234 is provided to concatenation port 245 where 8 "zero" bits are added at the beginning of the 19-bit output signal and 9 "zero" bits are added after the 19-bit output signal of summing circuit port 234. The 36-bit output signal of concatenation port 245 is therefore equal to:

$$(A[17:9]*B[8:0]+A[8:0]*B[17:9])*2^{9}.$$

The 36-bit output signal of concatenation port 245 is provided to summing circuit 235. Summing circuit 235 adds the output signals of concatenation ports 244 and 245 to produce a 36-bit output signal at output port 203 which is equal to:

$$A[17:9]*B[17:9]*2^{18}+(A[17:9]*B[8:0]+A[8:0]*B[17:9])*2^{9}+A[8:0]*B[8:0]*2^{0}$$

(i.e. the product of 18-bit words A[17:0] and B[17:0]).

To perform two 9-bit multiplications, the BYTE select signal at port 204 is set to a logic high state. This causes the 9-bit output signals of gating circuits 240 and 241 to be zero. Consequently, the output signals of multipliers 230 and 233 are zero. As a result, the output signals of summing circuit 234 and concatenation port 245 are also zero. Multipliers 231 and 232 operate as previously discussed in connection with the 18-bit multiplication. Thus, the upper 18-bits of the 36-bit output signal of concatenation port 244 are equal to the 18-bit product of 9-bit upper bytes A[17:9] and B[17:9]. The lower 18-bits of the 36-bit output signal of concatenation port 244 are equal to the 18-bit product of 9-bit lower bytes A[8:0] and B[8:0]. The 36-bit output signal of concatenation port 244 is passed through summing circuit 235 to output port 203 unchanged because the other input signal provided to summing circuit 235 (from concatenation port 245) is zero.

Figure 1:
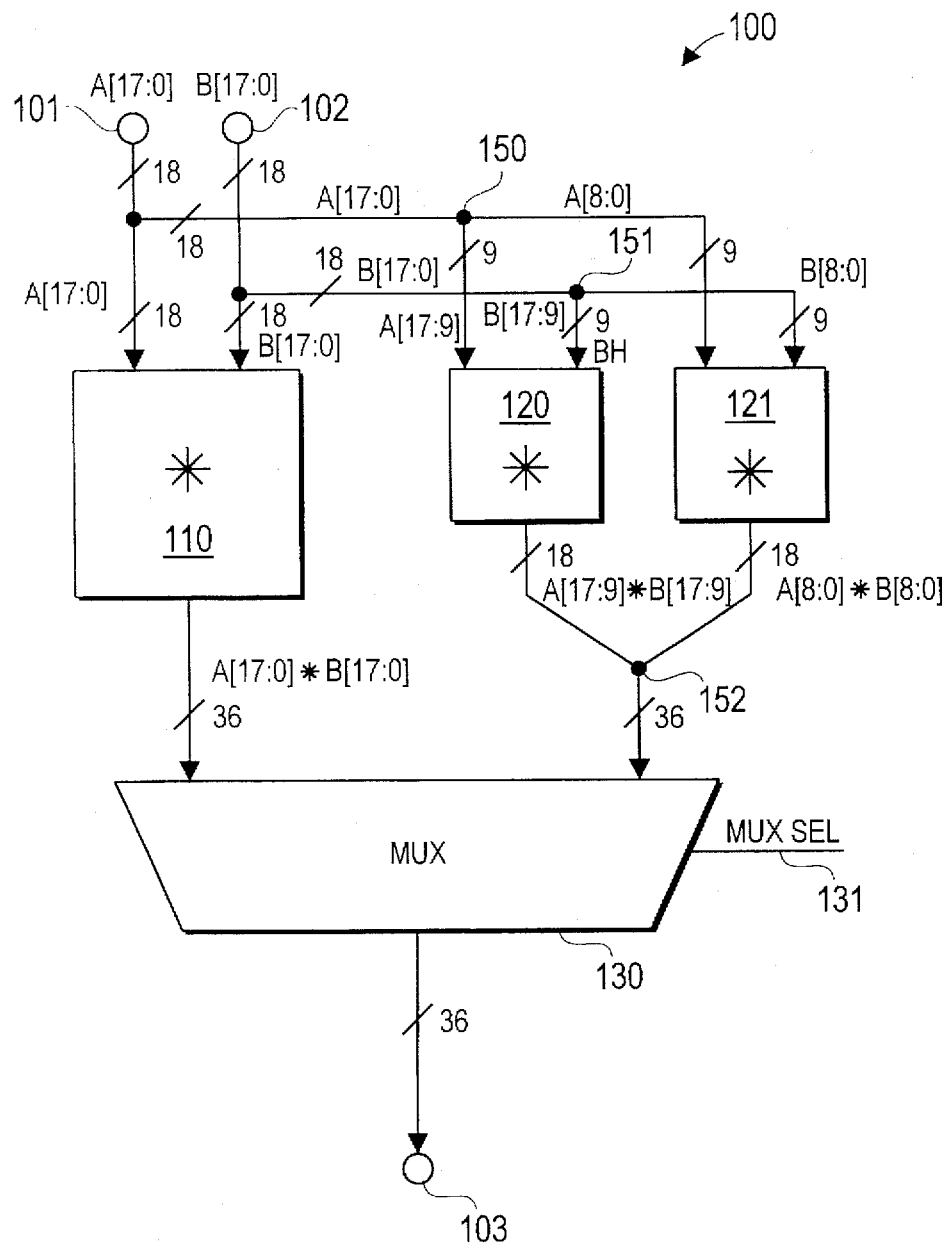
FIG. 1 is a block diagram of a prior art multiplier circuit.

Multiplier circuit 200 thereby selectably performs either an 18-bit multiplication or two 9-bit multiplications. When compared with multiplier circuit 100 (FIG. 1), multiplier circuit 200 eliminates the need for 9-bit multipliers 120 and 121 and multiplexer 130. Thus, multiplier circuit can be fabricated with a smaller layout area than prior art multiplier circuits.

The principles of above described multiplier circuit 200 may be modified to perform signed (i.e., 2's complement) multiplication. In such a case, four 10×10 signed multipliers are employed to produce products A[8:0]*B[8:0], A[17:9]*B[8:0], A[8:0]*B[17:0], and A[17:0]*B[8:0], in a manner similar to that discussed above. Note, however, that since each of such signed multipliers expects as inputs two signed numbers A and B, the most significant bit (MSB) of 9-bit lower bytes A[8:0] and B[8:0] and 9-bit upper bytes A[17:0] and B[17:0] will be interpreted as a sign bit. During BYTE mode, where two independent 9×9 multiplies are to be performed, the respective MSB of each 9-bit bytes will be the sign bit. During WORD mode, where an 18×18 multiply A[17:0]*A[17:0] is to be performed, the respective MSB of 9-bit lower bytes A[8:0] and B[8:0] is not a sign bit but rather represent the $2^{8}$ place value. Accordingly, during WORD mode lower bytes A[8:0] and B[8:0] must be converted to signed numbers.

Figure 7:
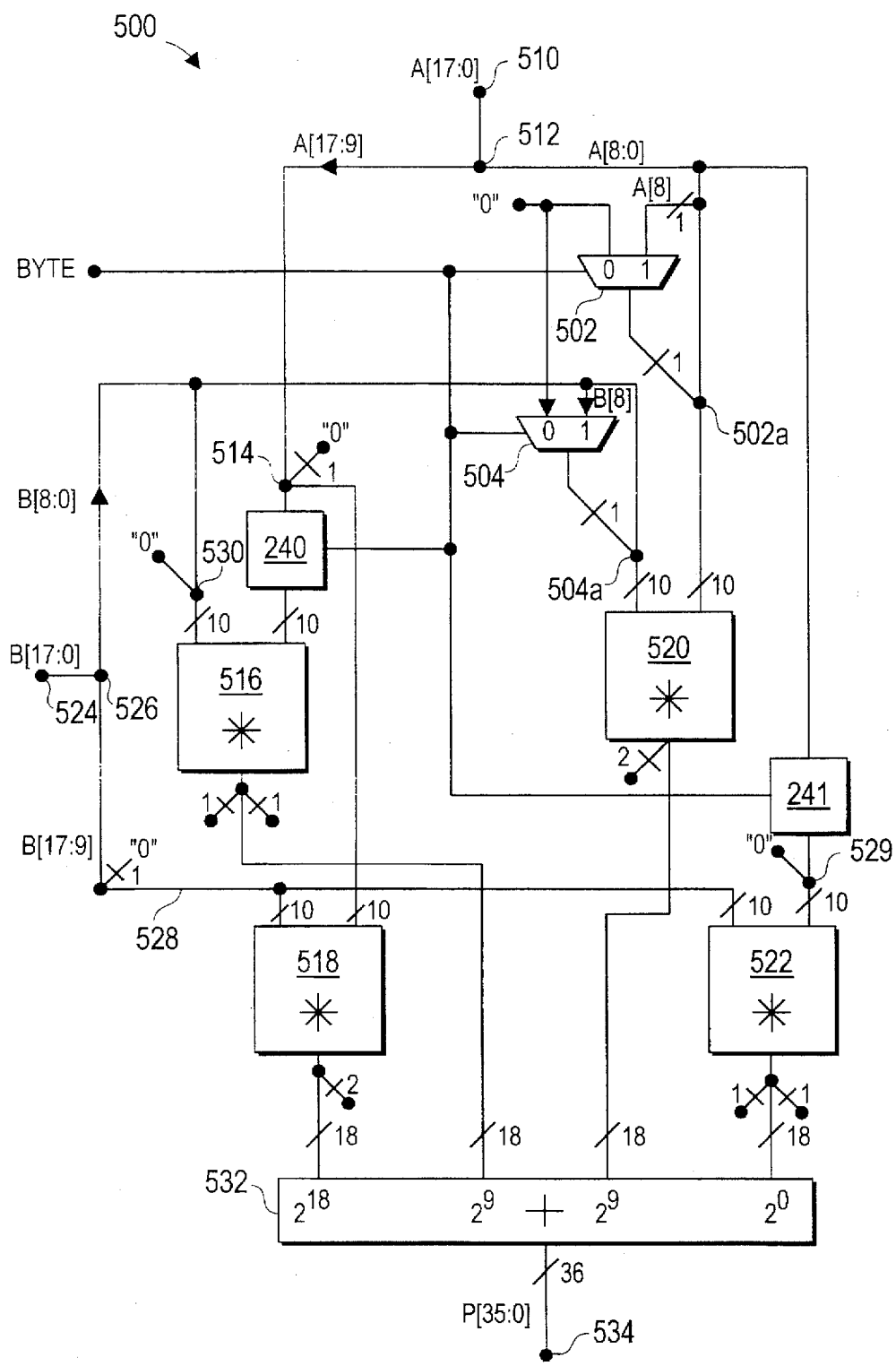
FIG. 7 is a block diagram of a signed multiplier circuit in accordance with the present invention.

FIG. 7 is a block diagram of multiplier circuit 500 in accordance with the present invention capable of performing either one 18-bit signed multiplication or two 9-bit signed multiplications. To perform an 18-bit multiplication, a low BYTE control signal is provided to the control terminal of multiplexers 502 and 504 and to gating circuits 240 and 241. An 18-bit word A[17:0] is provided to input port 510 and is divided into two 9-bit bytes A[17:9] and A[8:0] at port 512. A single zero ("0") bit is added to the beginning, and thus becoming the new least significant bit (LSB), of the 9-bit upper byte A[17:9] at port 514. The resultant left shifted byte A[17:9, "0"]is provided as a 10-bit signal to an input bus of 10-bit signed multiplier 516 via gating circuit 240 and to an input bus of 10-bit signed multiplier 518.

The MSB of 9-bit lower byte A[8:0], e.g. A[8], and a zero bit are provided to the input ports of MUX 502. In response to a low BYTE signal, MUX 502 passes the zero bit which is then added as a sign bit to 9-bit lower byte A[8:0] at port 502a. In this manner, lower byte A[8:0] is provided as a positive, 10-bit signed signal to 10-bit signed multiplier 520. The 9-bit lower byte A[8:0] is also provided to an input of gating circuit 241 which, in response to a low BYTE signal, passes A[8:0] to port 529. A zero sign bit is added to A[8:0] at port 529, and the resultant 10-bit signed equivalent of A[8:0] is provided to an input bus of 10-bit signed multiplier 522.

An 18-bit word B[17:0] is provided to input port 524 and is divided into two 9-bit bytes A[17:9] and A[8:0] at port 526. A zero bit is added as the LSB to 9-bit upper byte B[17:9] at port 528. The resultant left shifted byte B[17:0] is provided to an input bus of multiplier 518 and to an input bus of multiplier 522.

A zero bit is then added as the MSB to 9-bit lower byte B[8:0] at port 530 and provided as a 10-bit signed signal to an input bus of multiplier 516. The MSB of 9-bit lower byte B[8:0], e.g. B[8], and a zero bit are multiplexed via MUX 504. In response to a low BYTE signal, MUX 504 passes the zero bit which is then added as a sign bit to B[8:0] at port 504a, thereby providing B[8:0] as a positive 10-bit signed number to an input bus of multiplier 520 in a manner similar to that discussed above with respect to lower byte A[8:0] and MUX 502.

The outputs of multipliers 516 and 522 are configured to drop the MSB and the LSB (least significant bit) from each of their respective outputs, thereby resulting in 18-bit output signals representing the products A[17:9]*B[8:0] and A[8:0]*B[17:9], respectively. The outputs of multipliers 520 and 518 are configured to drop the two MSB and two LSB from their respective outputs, thereby resulting in 18-bit output signals representing the products A[8:0]*B[8:0] and A[17:9]*B[17:9].

The output signals of multipliers 516, 518, 520 and 522 are aligned and added in adder 532 and then output at port 534 as 36-bit product P[35:0]. Adder 532 assigns a place value of $2^0$ to the product A[8:0]*B[8:0] output from multiplier 520, a place value of $2^9$ to the products A[17:9]*B[B:0] and A[8:0]*B[17:9] output from multipliers 516 and 522, respectively, and a place value of $2^{18}$ to the product A[17:9]*B[17:9] output from multiplier 2518. In this manner, adder 532 produces a 36-bit output signal P[35:0] at output port 534 is equal to:

A[17:9]*B(17:9]*$2^{18}$+(A[17:9]*B[8:0]+A[8:0]*B[17:9])*$2^9$+A[8:0]*B[8:0]*$2^0$ (i.e. the product of 18-bit words A[17:0] and B[17:0]).

To perform two 9-bit signed multiplications, BYTE is set high. In response thereto, MUX 502 outputs the sign bit of A[8:0] which is then added to A[8:0] as the sign bit, thereby effectively sign extending A[8:0]. The resultant sign-extended A[8:0] is then provided to multiplier 520 as a 10-bit signal. In a similar manner, MUX 504 and port 504a provide a sign-extended B[8:0] to an input bus of multiplier 520. This high BYTE signal also causes the 9-bit output signals of gating circuits 241 and 240 to be zero, as discussed with respect to FIG. 6. Consequently, the output signals A[17:9]*B[8:0] and A[8:09]*B[17:9] of respective multipliers 516 and 522 are zero. Multipliers 518 and 520 operate as previously discussed in connection with the 18-bit multiplication. The products A[17:9]*B[17:9] and A[8:0]*B[8:0] are multiplied by $2^{18}$ and $2^0$, respectively. Thus, the upper 18-bits of the 36-bit output signal at port 534 are equal to the 18-bit product of 9-bit upper bytes A[17:9] and B[17:9], while the lower 18-bits of the 36-bit output signal of port 534 are equal to the 18-bit product of 9-bit lower bytes A[8:0] and B[8:0].

Multiplier circuit 500 thereby selectably performs either an 18-bit signed multiplication or two 9-bit signed multiplications while employing only four 10×10 signed multipliers, thereby realizing a savings in circuit layout area.

In another embodiment in accordance with the present invention, the design of multiplier circuit 500 is modified to incorporate Booth encoding and, as will be discussed below, uses two 9×10 multipliers and two 9×8 multipliers, thereby resulting in an even further savings in circuit layout area.

Figure 8A:
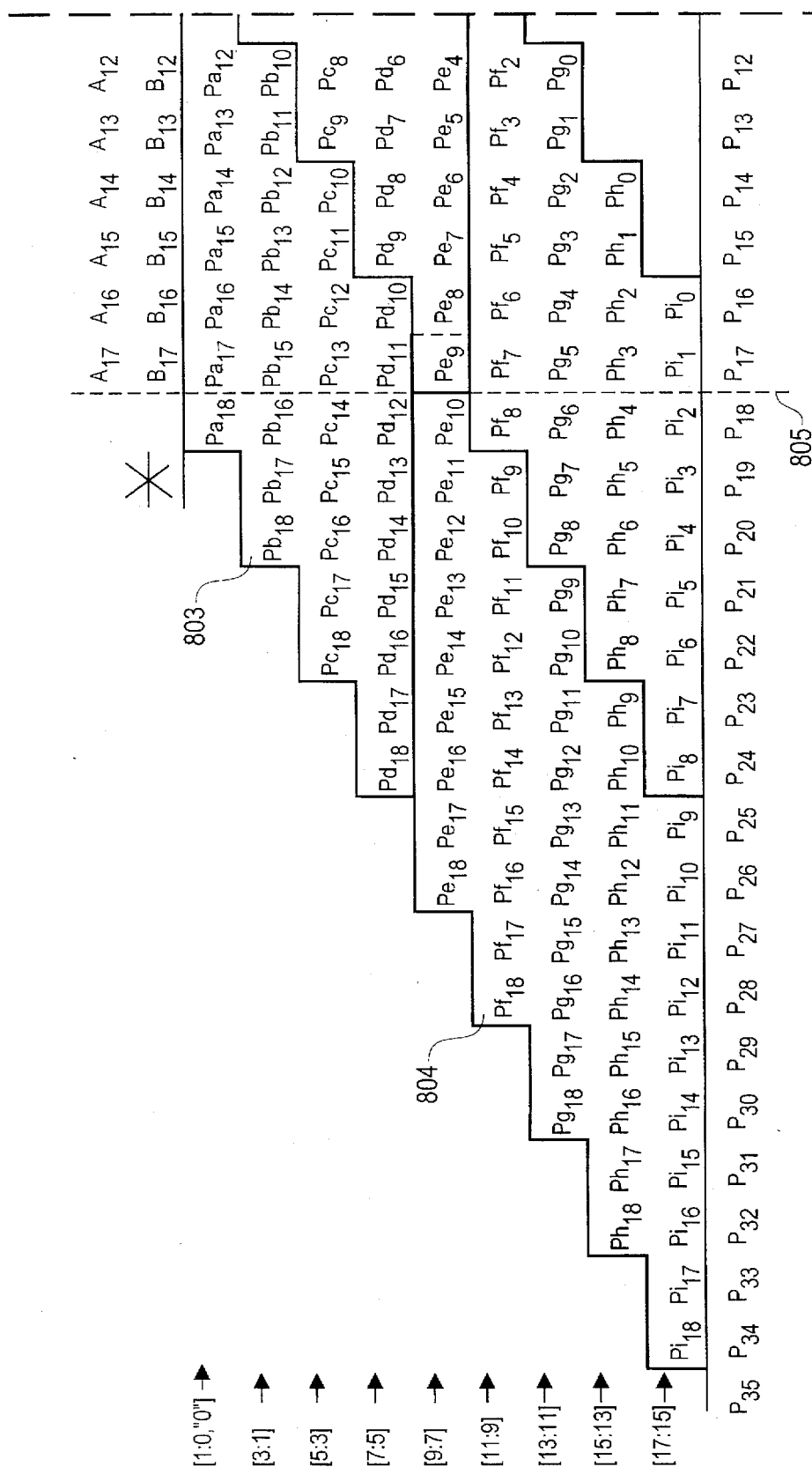
FIG. 8 is a schematic diagram illustrating longhand multiplication of two 18-bit numbers using Booth encoding to obtain a 36-bit product.
Figure 8B:
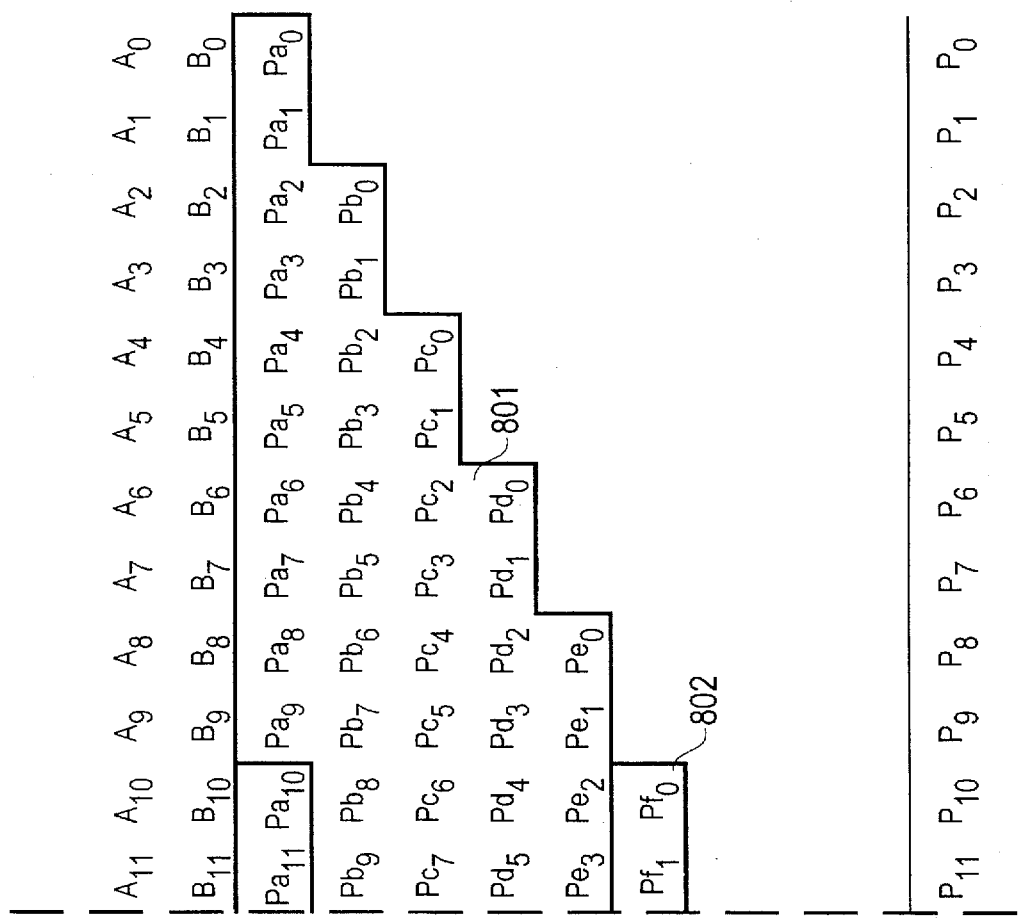

FIG. 8 illustrates a longhand 2-bit Booth-encoded multiplication of two 18-bit numbers A[17:0] and B[17:0] to generate nine rows of 19-bit Booth partial products Pa[18:0] –Pi[18:0] which, when added together, result in 36-bit product P[35:0]. The first partial product Pa[18:0] are generated by encoding respective bits of A[17:0] according to B[1], B[0], and 0. The second partial product P[18:0] are generated by encoding respective bits of A[17:0] according to B[3:1], and so on, as indicated in FIG. 8.

Figure 9A:
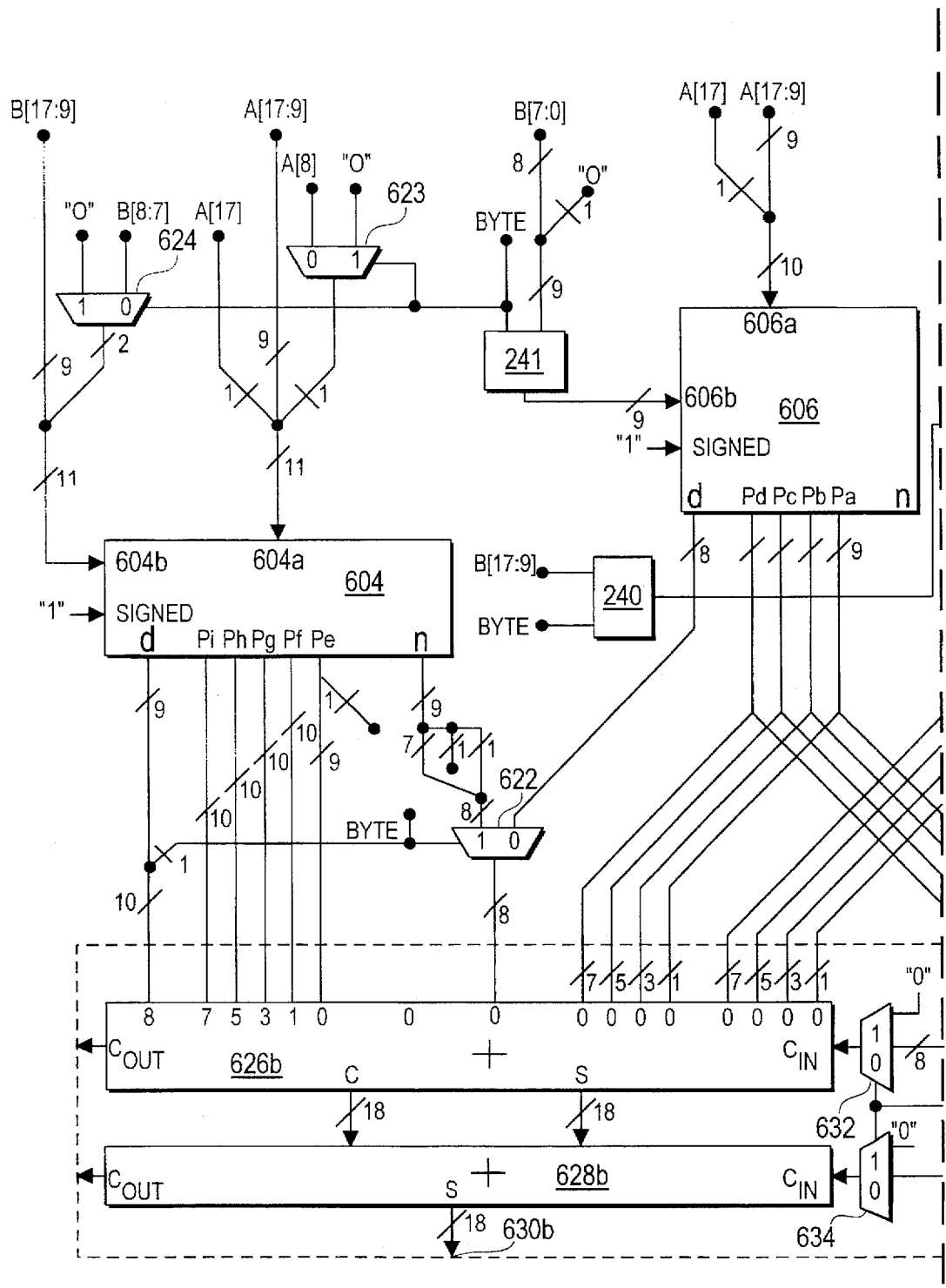
FIG. 9 is a block diagram of a signed multiplier in accordance another embodiment of the present invention.
Figure 9B:
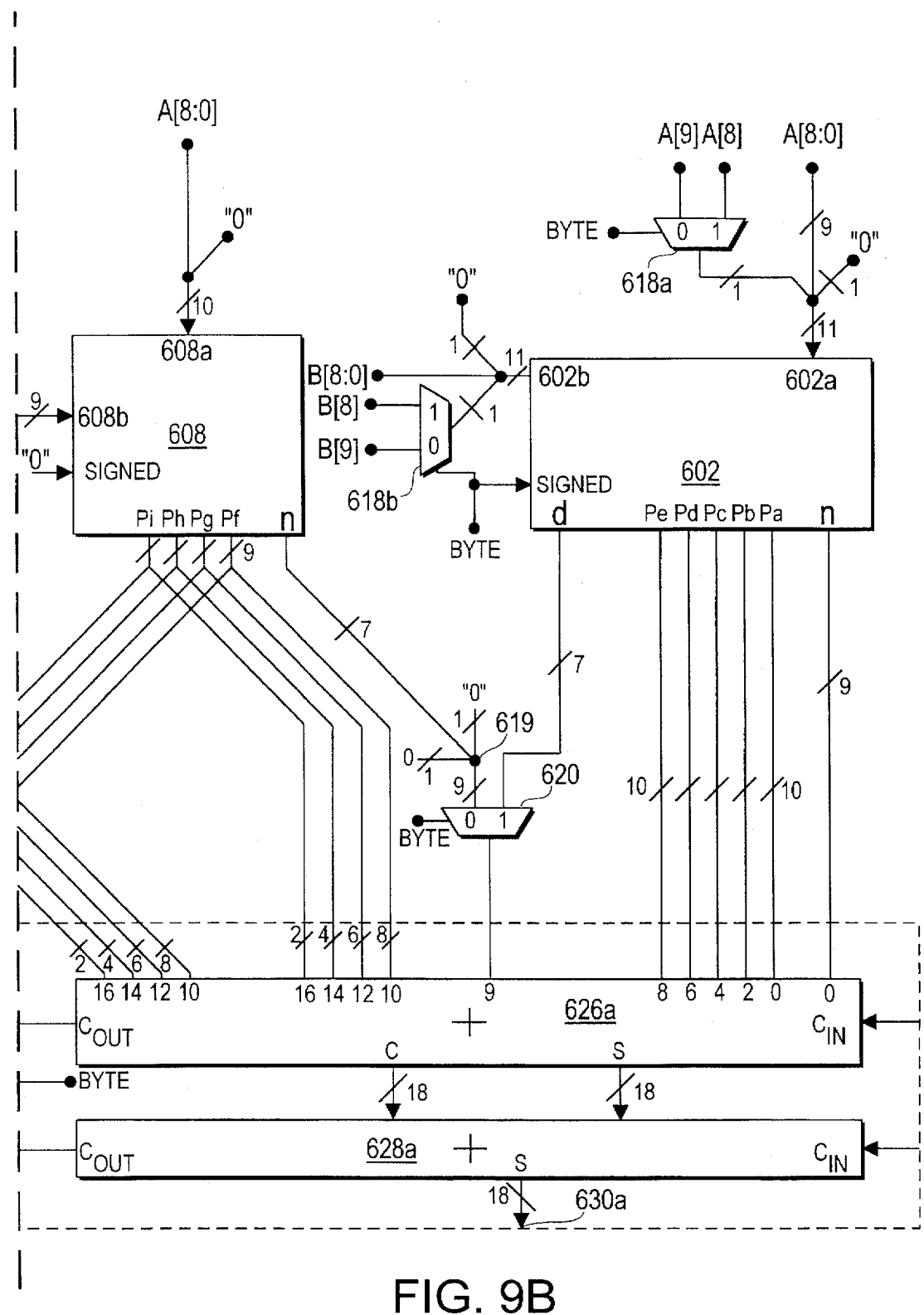

FIG. 9 is a block diagram of a multiplier circuit 600 in accordance with a preferred embodiment of the present invention. Multiplier circuit 600 includes two 9×10 signed multipliers 602, 604 and two 9×8 signed multiplies 606, 608. Two 18-bit words A[17:0] and B[17:9] are provided to multiplier circuit 600 via a bus (not shown for simplicity).

Multiplier 602 receives lower bytes A[8:0] and B[8:0] as follows. As zero is added as the LSB and either A[8] or A[9] is added, via MUX 618a, as the MSB to lower byte A[8:0]. During BYTE mode, MUX 618a passes A[9] and thereby sign extends A[8:0]. During WORD mode (BYTE=0), MUX 618a passes A[8] and thereby converts A[8:0] to a 9-bit signed number. The resultant 11-bit signal is then provided to multiplier 602 via port 602a. The 9-bit lower byte B[8:0] is converted to a signed 11-bit signal via MUX 618b in the same manner as described above with respect to lower byte A[8:0], and provided to multiplier 602 via port 602b. Control signal BYTE is provided to multiplier 602 via port SIGNED. In response to these input and control signals, multiplier 602 generates 5 Booth partial products Pa[9:0] to Pe[9:0] on its output buses Pa–Pe, respectively. Note that the 5 Booth partial products output from multiplier 602 correspond to the 5 Booth partial products Pa[9:0]–Pe[9:0] shown in box 801 of FIG. 8. Multiplier 602 also outputs a 9-bit sign offset string "010101011" and a 9-bit negation string NEG at its respective output ports d and n. The sign offset string is used to sign extend the partial products, and the negation string is used to compensate for 2-bit Booth encoding. These techniques are well known in the art and thus will not be discussed in detail herein.

Lower byte A[8:0] is left shifted by adding thereto a zero as the LSB and provided as a 10-bit input signal to multiplier 608 via port 608a. The upper byte B[17:9] is gated with the BYTE control signal in gating circuit 241. Thus, as discussed earlier with respect to FIG. 6, gating circuit provides to multiplier 608 at port 608b a string of zeros during BYTE mode and upper byte B[17:0] during WORD mode. A logical low is hardwired to the SIGNED port of multiplier 608. In response thereto, multiplier 608 generates 4 Booth partial products Pf[8:0]–Pi[8:0] (corresponding to box 802 of FIG. 8) on its output ports Pf–Pi, respectively. Multiplier 608 also outputs a 7-bit negation string to which a zero LSB and a zero MSB are added at port 619. The resulting 9-bit negation string is multiplexed with the 9-bit sign offset string output from multiplier 602. The output of MUX 620 is controlled by BYTE and, as such, passes the 9-bit negation string output from multiplier 608 during WORD mode and passes the 9-bit sign offset string output from multiplier 602 during BYTE mode. The above-described multiplexing of the negation string output from multiplier 608 and the offset string output from multiplier 602 is necessary to "blend" the two signals before being combined with Booth encoded partial products Pa[18:0]–Pi[18:0] in adding circuit 625.

Multiplier 606 receives upper byte A[17:9] via a 9-bit input bus at port 606a. A zero is added as the LSB to B[7:0] and the resultant 9-bit signal is gated with the BYTE control signal in gating circuit 241. Thus, gating circuit 241 provides a string of zeros during BYTE mode and a left-shifted B[7:0] during WORD mode to multiplier 606 via port 606b. A logical high is hardwired to the SIGNED port of multiplier 606. In response to its input signals, multiplier 606 provides 4 Booth partial products Pa[18:10]–Pd[18:10] (corresponding to box 803 of FIG. 8) on its output ports Pa–Pd, respectively. Multiplier 606 also outputs at its output port d an 8-bit sign offset string "10101011" which is provided as an input to MUX 622. Note that since multiplier 602 has already generated a negation string NEG corresponding to the first 5 rows of Booth partial products, the negation string generated by multiplier 606 is ignored.

A zero is added as the MSB and either A[8] or a zero is added as the LSB to upper byte A[17:9], where MUX 623 passes the zero during BYTE mode and A[8] during WORD mode. The resultant 11-bit signed signal is provided as an input to multiplier 606 via port 606a. Either a 2-bit zero string or B[8:7] is added as the 2-LSB to upper byte B[17:9] via a MUX 624 and the resultant 11-bit signal is provided to multiplier 604 via port 604b. MUX 623 passes B[8:7] in word mode and the 2-bit zero string in BYTE mode. The SIGNED control port of multiplier 604 is hardwired to logic high. In response to these input and control signals, multiplier 604 generates five Booth partial products Pe[18:9] to Pi[18:9] (corresponding to box 804 of FIG. 8) on its output buses Pa–Pe, respectively. Note that bit 9 of the 5 Booth partial product, Pe[9], appears as the MSB of the partial product Pe[9:0] output from multiplier 602 and as the LSB of the partial product Pe[18:9] output from multiplier 604 and, as such, is discarded such that a 9-bit partial product Pe[18:10] is provided to adding circuit 625. Multiplier 604 also outputs a 9-bit negation string NEG at output port n. The second LSB of this negation string is discarded, and the resultant 8-bit negation string is gated in MUX 622 with the 8-bit offset string output from multiplier 606. MUX 622 provides to adding circuit 625 the 8-bit offset string output from multiplier 606 during WORD mode and the 8-bit negation string output from multiplier 604 during BYTE mode. Multiplier 604 provides a 9-bit offset string equal to "01010101" during BYTE mode and equal to "010101010" during WORD mode. The control signal BYTE is added as a LSB to the negation string, and thus resulting 10-bit offset string is provided to adding circuit 625.

The Booth partial products Pa[18:0]–Pi[18:0] are aligned and added by adding circuit 625 as shown in FIG. 9 and consistent with the longhand notation depicted in FIG. 8. The right side of adding circuit 625 includes an 18-bit carry save adding circuit 626a and a carry look-ahead adding circuit 628a and provides at output port 630a the lower 18-bits P[17:0] of product P[35:0]. In a similar manner, the left side of adding circuit 625 includes an 18-bit carry save adding circuit 626b and a carry look-ahead adding circuit 628b and provides at output port 630b the upper 18-bits P[35:18] of product P[35:0]. Thus, referring to FIG. 8, the right side of adding circuit 625 will combine those bits of Booth partial products Pa–Pi lying to the right of dashed line 805, while the left side of adding circuit 625 will combine those bits of Booth partial products Pa–Pi lying to the left of dashed line 805.

Adding circuits 626a and 628a are preferrably conventional tree structrerd 10 input adders. Such adders are well known in the art and thus will not be discussed in detail herein.

Thus, the 9-bit negation string NEG output from multiplier 602 and provided to adding circuit 626a is multiplied by $2^0$. 10-bit partial products Pa[9:0], Pb[9:0], Pc[9:0], Pd[9:0] and Pe[9:0] generated by multiplier 603 are provided to add circuit 626a and where they are effectively multiplied by $2^0$, $2^2$, $2^4$, $2^6$, and $2^8$, respectively. The 9-bit output of MUX 620 is multiplied by $2^9$. The 8, 6, 4, and 2 LSB of partial products Pf[8:0], Pg[8:0], Ph[8:0], and Pi[8:0], respectively, generated by multiplier 608 are provided to add circuit 626a where they are effectively multiplied by $2^{10}$, $2^{12}$, $2^{14}$, and $2^{16}$, respectively. In a similar manner, the 8, 6, 4, and 2 LSB of partial products Pa[18:10], Pb[18:10], Pc[18:10], and Pd[18:10], respectively, provided to add circuit 626a are effectively multiplied therein by $2^{10}$, $2^{12}$, $2^{14}$, and $2^{16}$, respectively. These multiplications, which may be performed by left-shifting or any other well known "power of 2" multiplication technique, ensure the proper aligning of Booth partial products Pa–Pi as indicated in FIG. 8. For instance, partial products Pa–Pe should align such that the addition of Pa[7], Pb[5], Pc[3], and Pd[1] produces bit P[7] of P[35:0]. Note that carry bits, negation strings NEG, and sign strings are not depicted in FIG. 8. Adding circuit 626a generates 18-bit sum S and carry C signals which are provided as inputs to adding circuit 628a. Adding circuit 626a provides an 8-bit carry out signal $C_{out}$ which is multiplexed with an 8-bit zero by a MUX 632. MUX 632 passes to the carry-in port of adding circuit 626b the $C_{out}$ from adding circuit 626a during WORD mode and the 8-bit zero string during BYTE mode. Note that this zero string is necessary to maintain the integrity of products P[35:18] and P[17:0] during BYTE mode.

Adding circuit 628a combines the 18-bit sum S and carry C signals generated by adding circuit 626a and in response thereto generates 18-bit product P[17:0] at output port 630a and a 1-bit carry out signal $C_{out}$ which is multiplexed at MUX 634 with a 1-bit zero string. MUX 634 passes to adding circuit 628b the carry signal $C_{out}$ generated by adding circuit 628a during WORD mode and the 1-bit zero string during BYTE mode. Note that together the respective carry-outs passed via MUXs 632, 634 correspond to the carry across dashed line 805 in FIG. 8.

The 1, 3, 5, and 7 MSB of partial products Pf[8:0], Pg[8:0], Ph[8:0], and Pi[8:0], respectively, generated by multiplier 608 are provided to adding circuit 626b and are each multiplied therein by $2^0$. The 1, 3, 5, and 7 MSB of partial products Pa[18:10], Pb[18:10], Pc[18:10], and Pd[18:10], respectively, generated by multiplier 606 are provided to adding circuit 626b and are each multiplied therein by $2^0$. The 9 MSB of partial product Pe[18:9], e.g. Pe[18:10], generated by multiplier 604 is provided to adding circuit 626b and multiplied therein by $2^0$. Discarding Pe[9] from P[18:9] in such a manner is necessary since Pe[9] has already been added by adding circuit 626a, as described above and depicted in FIG. 8 (note that Pe[9] lies to right of dashed line 805). The 10-bit partial products Pf[18:9], Pg[18:9], Ph[18:9], and Ph[18:9] output from multiplier 604 are provided to adding circuit 626b and are multiplied by $2^1$, $2^3$, $2^5$, and $2^7$, respectively. The output of MUX 622, e.g. the 8-bit negation string NEG resulting from multiplier 604 during BYTE mode and the 8-bit sign offset string output from multiplier 606 during WORD mode, is provided to adding circuit 626b and is multiplied therein by $2^0$. Note that the signal output from MUX 632 and received as at the carry in $C_{in}$ port of adding circuit 626b is multiplied therein by $2_0$.

After aligning the above described signals, adding circuit 626b generates in response thereto 18-bit sum S and carry C signals and a carry out $C_{out}$. The signal output from MUX 634 is combined in adding circuit 628b with the 18-bit sum and carry signal generated by adding circuit 626b to produce 18-bit product P[35:18] at output port 630b.

Figure 10A:
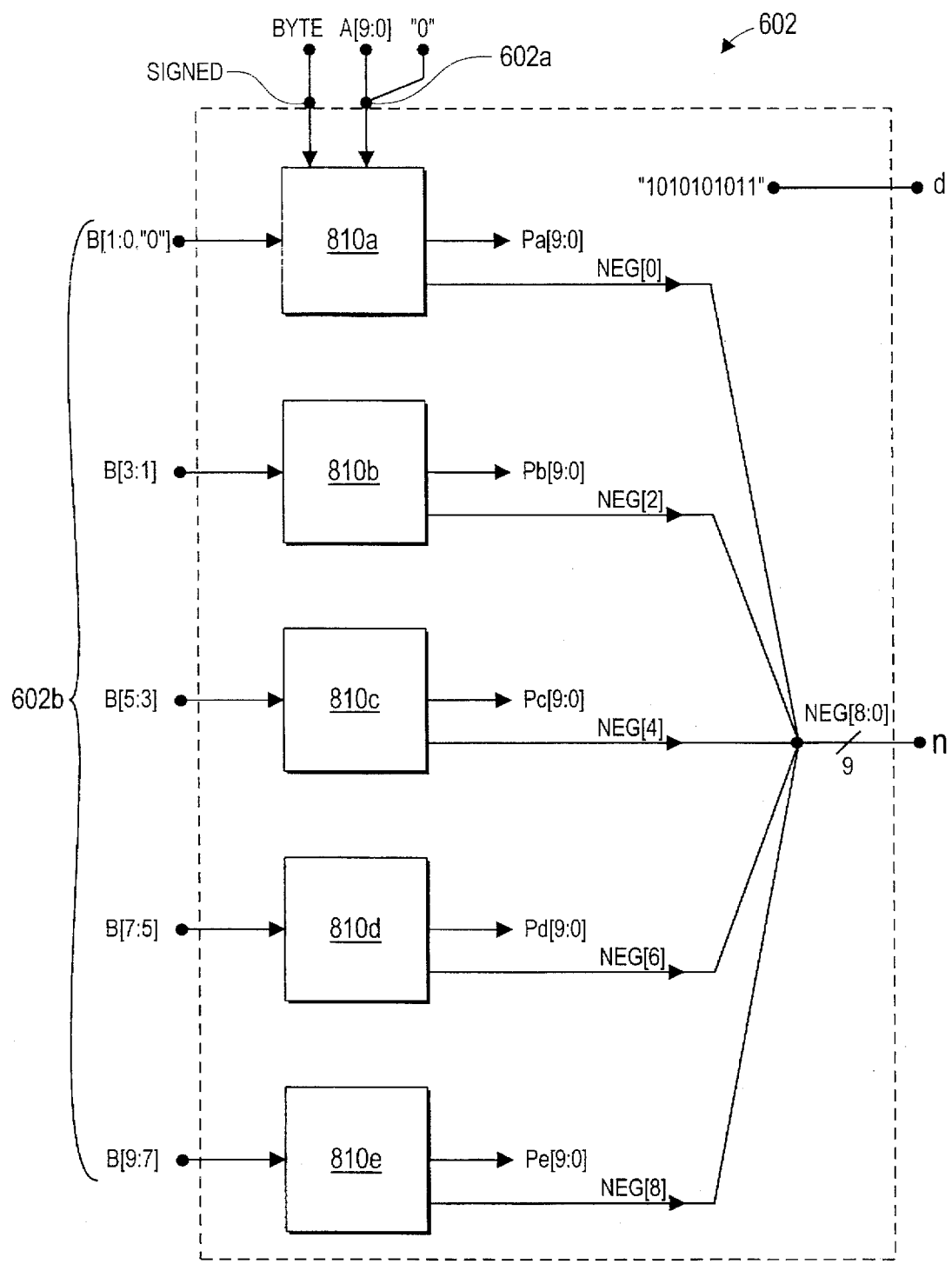
FIGS. 10a–10d is a block diagrams of respective signed multipliers in accordance with the present invention.
Figure 11:
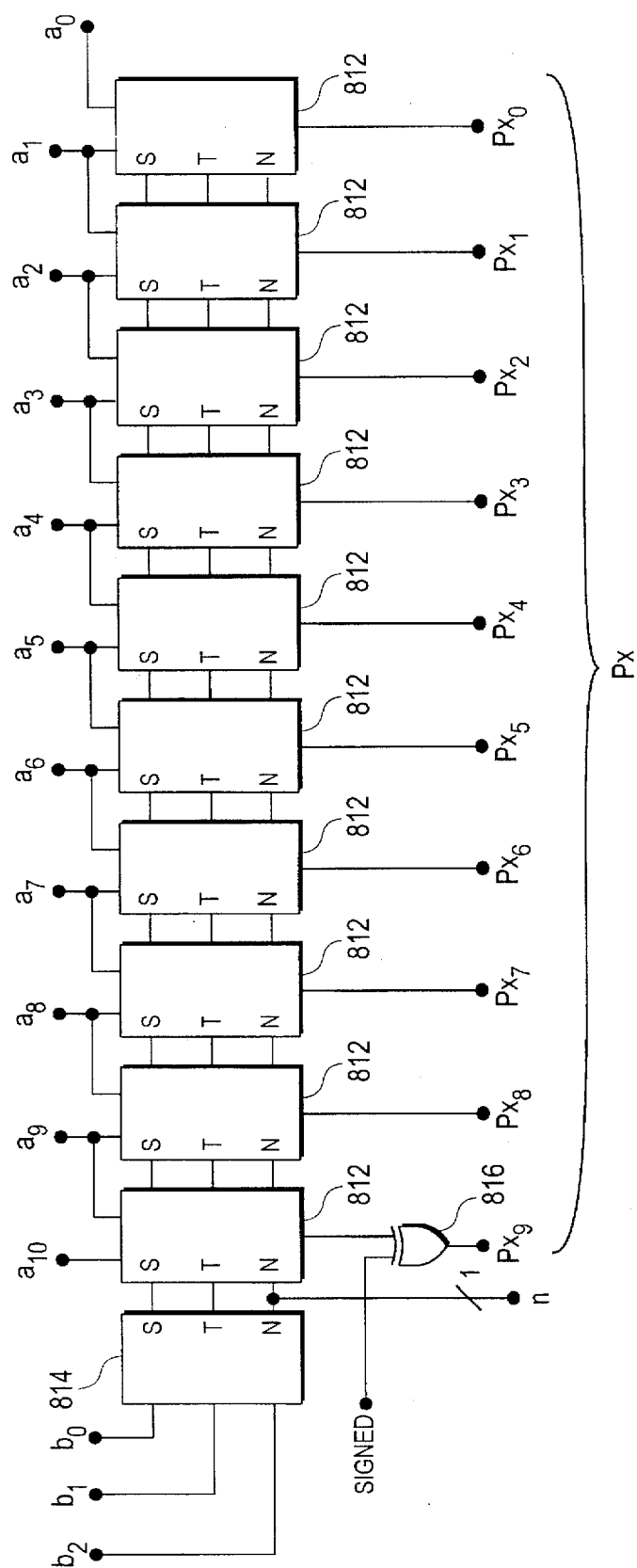
FIG. 11 is a block diagram illustrating a row of partial product generators employed by signed 9×10 multipliers in accordance with the present invention.
Figures 12, 13:
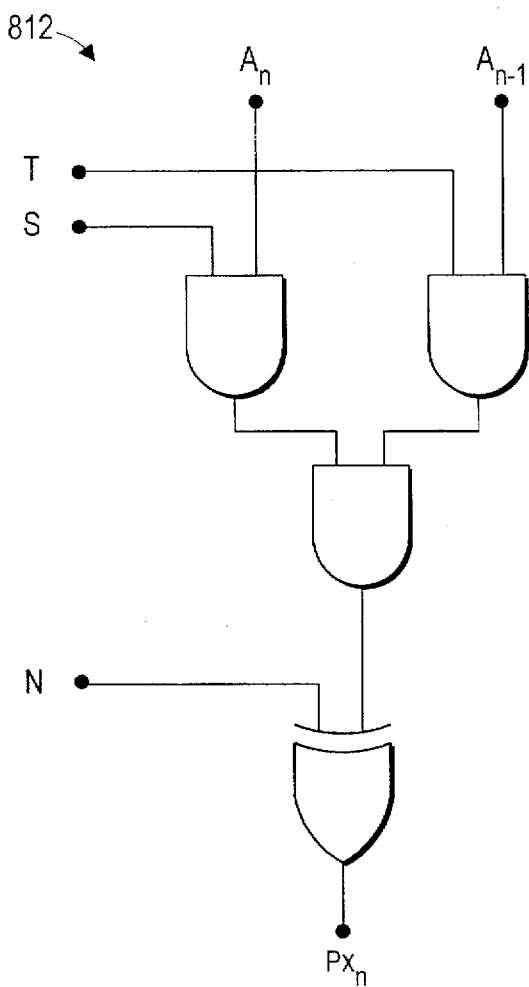
FIG. 12 is a schematic diagram of a partial product generator in accordance with the present invention.
FIG. 13 is a truth table for generating Booth control signals in accordance with the present invention.

The 9×10 multiplier 602 includes an array of five identical rows 810a–810e of Booth-encoded partial product generators (PPG) 812, as illustrated in FIGS. 10a and 11. The first row 810 of multiplier 602 generates Booth-encoded partial products Pa[9:0] in response to A[9:0] and B[1:0, "0"] as follows. The bits of the 11-bit input signal provided to multiplier 602 at port 602a (see also FIG. 9) are provided to respective input ports $a_{10}$–$a_0$ of PPGs 812 of row 810a (and to rows 810b–810e). The 3-bit input signal B[1:0, "0"] is provided to a 2-bit Booth encoder 814 which generates in response thereto Booth signals S, T, and N according to the truth table shown in FIG. 13. These Booth signals S, T and N are provided to each PPG 812 of row 810a. Booth encoder 814 may be a conventional logic circuit of well known design. Referring also to FIG. 12, which shows a gate-level diagram of a PPG 812, each PPG provides, in response to Booth signals S, T, N and the input signals received at ports $a_n$ and $a_{n-1}$, 1-bit $Px_n$ of partial product Pa[9:0]. As such, PPGs 812 of row 810a collectively generate partial product Pa[9:0].

Similarly, the PPGs 812 of row 810b generate partial product Pb[9:0] in response to 3-bit signal B[3:1] and the 11-bit signal received at port 602a, the PPGs 812 of row 810c generate partial product Pc[9:0] in response to 3-bit signal B[5:3] and the 11-bit signal received at port 602a, and so on. In this manner, rows 810a–810e generate partial products Pa[9:0], Pb[9:0], Pc[9:0], Pd[9:0], and Pe[9:0], respectively.

The negation string NEG provided at output port n of multiplier 602 is constructed as follows. As shown in FIGS. 10a and 11, rows 810a–810e of multiplier 602 generate the even bits NEG[0], NEG[2], NEG[4], NEG[6], NEG[8], respectively, of NEG[8:0] while the odd bits NEG[1], NEG[3], NEG[5], and NEG[7] of NEG[8:0] are zero. Note that the output of the MSB PPG 812 of each of rows 810a–810e, e.g., $Px_9$, is gated with the BYTE signal received at the signed port of multiplier 602 via an XOR gate 816, thereby passing the output of the MSB 812 during WORD mode and inverting the output of the MSB PPG 812 during BYTE mode.

Figure 10B:
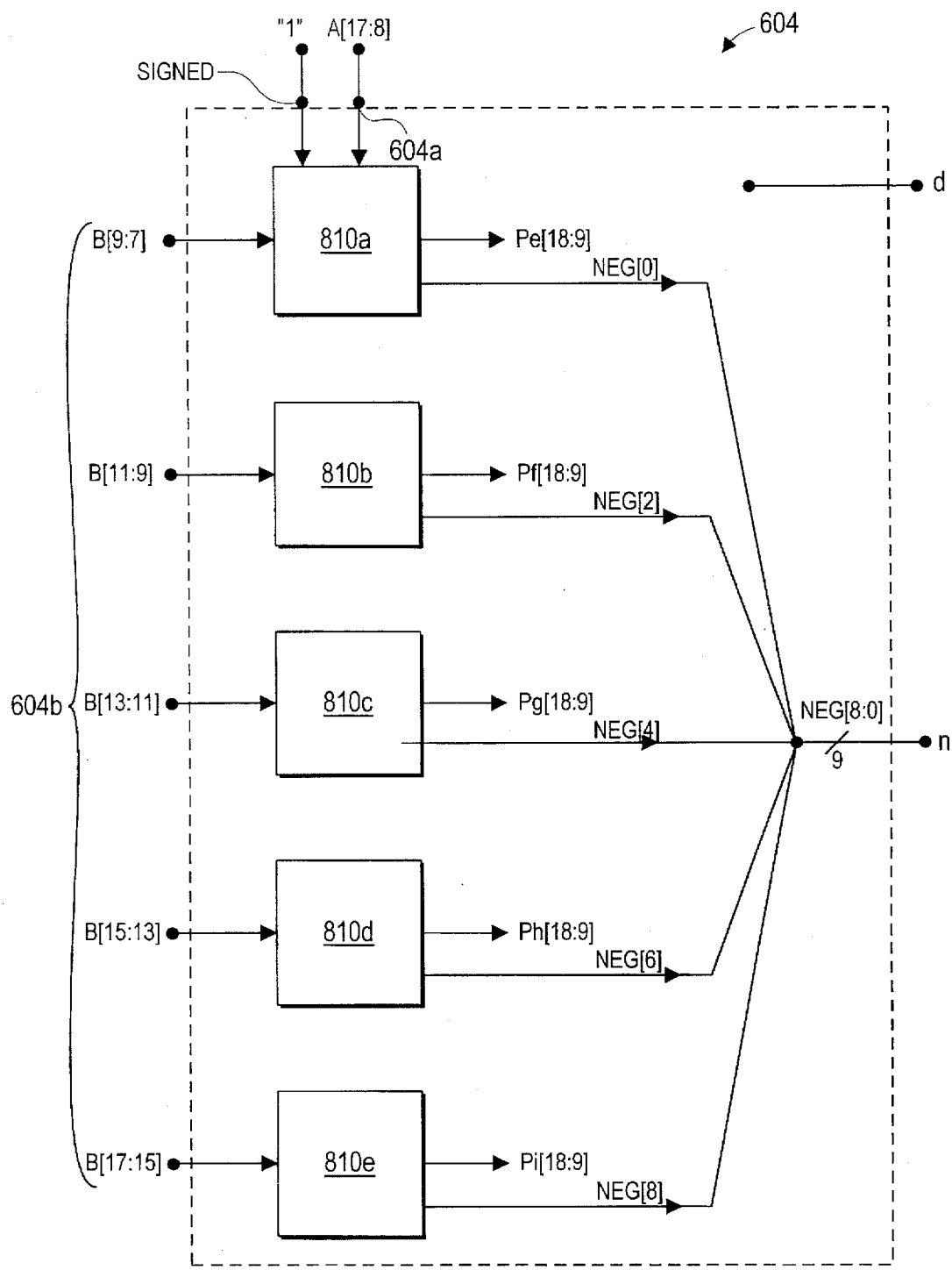

The structure of 9×10 multiplier 604 is identical to that of multiplier 602. Referring to FIG. 10b, the 11-bit signal generated from A[17:9] and provided to multiplier 604 at port 604a is provided to PPGs 812 via respective ports $a_n$ and $a_{n-1}$ of each of rows 810a–810e. The first row 810a of PPGs 812 within multiplier 604 receives 3-bit input signal B[9:7] and, in a manner described above with reference to FIGS. 11–13, generates partial product Pe[18:9] (recall that LSB Pe[9] is discarded before providing to adding circuit 625). In a similar manner, rows 810b–810e of PPGs 812 within multiplier 604 generate partial products Pf[18:9]–Pi[18:9], respectively. The output of the MSB PPG 812 of each of rows 810a–810e within multiplier 604 is gated with a "1" via an XOR gate 816, thereby complementing the output of the MSB PPG 812.

Referring to FIGS. 10b and 11, the negation string NEG provided at output port n of multiplier 604 is constructed in manner identical to that discussed above with respect to multiplier 602.

Figure 10C:
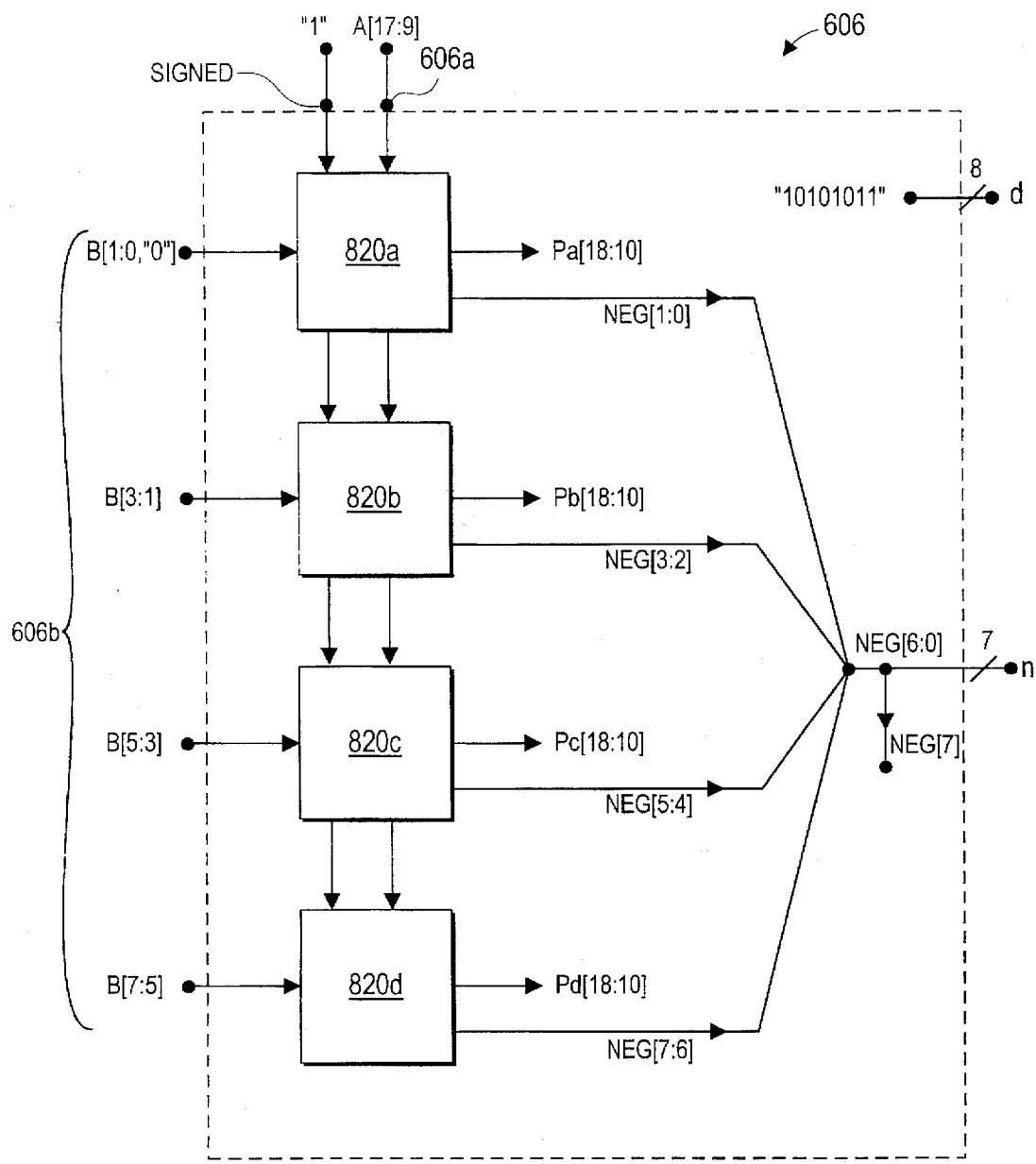
Figure 14:
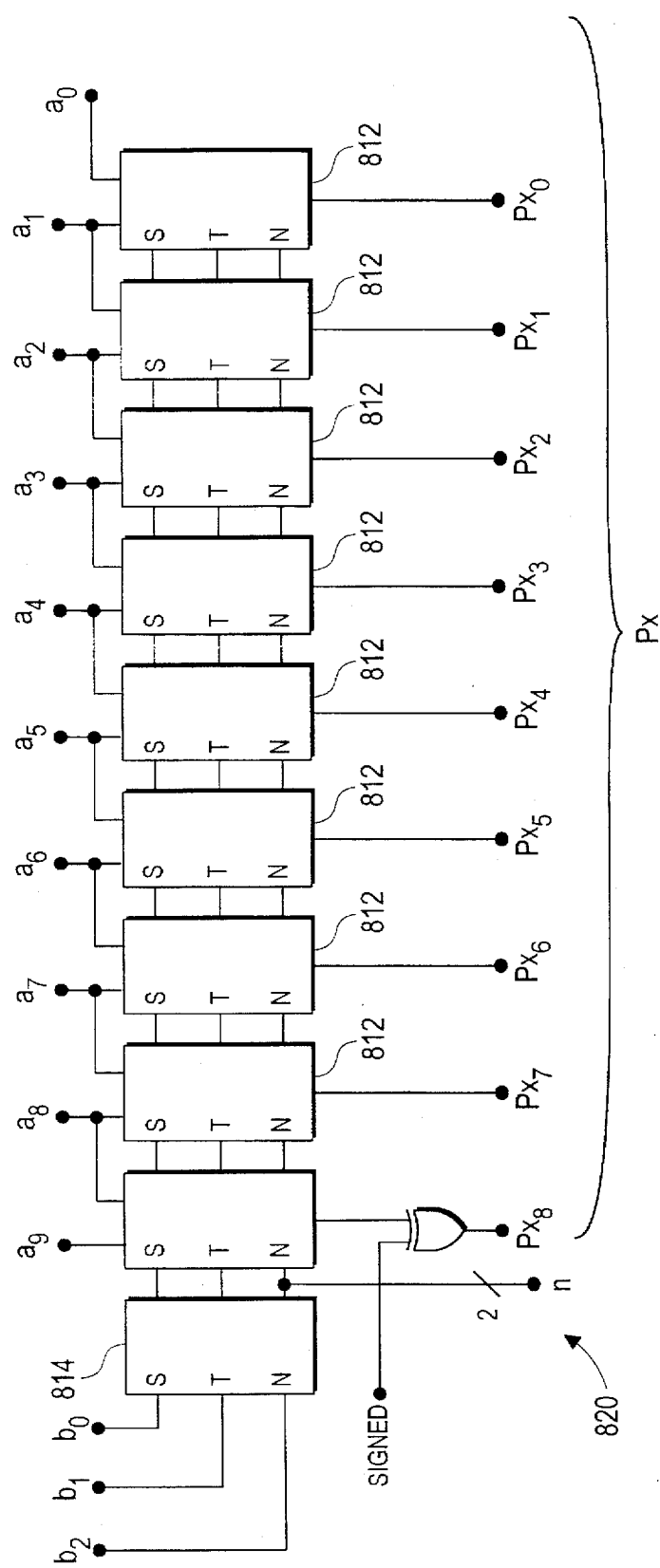
FIG. 14 is a block diagram illustrating a row of partial product generators employed by signed 9×8 multipliers in accordance with the present invention.

Referring to FIG. 10c and 14, the structure of 9×8 multiplier 606 is identical to that of multipliers 602 and 604, except that multiplier 606 has four rows 820 each having nine PPGs 812 and one Booth encoder 814. Thus, the 10-bit signal generated from A[17:9] and provided to multiplier 606 at port 606a is provided to PPGs 812 via respective ports a[8:0] of each of rows 810a–810d, where the first row 810a of PPGs 812 within multiplier 606 receives 3-bit input signal B[1:0, "0"] and, in a manner described above with reference to FIGS. 12 and 13, generates partial product Pa[18:10] In a similar manner, rows 810b–810d of PPGs 812 within multiplier 606 generate partial products Pb[18:10]–Pd[18:10], respectively. Note that the output of the MSB PPG 812 of each of rows 820a–820d within multiplier 606 is gated with a "1" via an XOR gate 816, thereby complementing the output of the MSB PPG 812.

The negation string NEG[6:0] provided at output ports n of multiplier 606 is generated as follows. Referring to FIGS. 10c and 14, rows 820a–820d of multiplier 606 each generate two consecutive bits, e.g. NEG[1:0], NEG[3:2], NEG[5:4], and NEG[7:6], respectively, of NEG[7:0]. The MSB is discarded such that NEG[6:0] is provided to port n of multiplier 606.

Figure 10D:
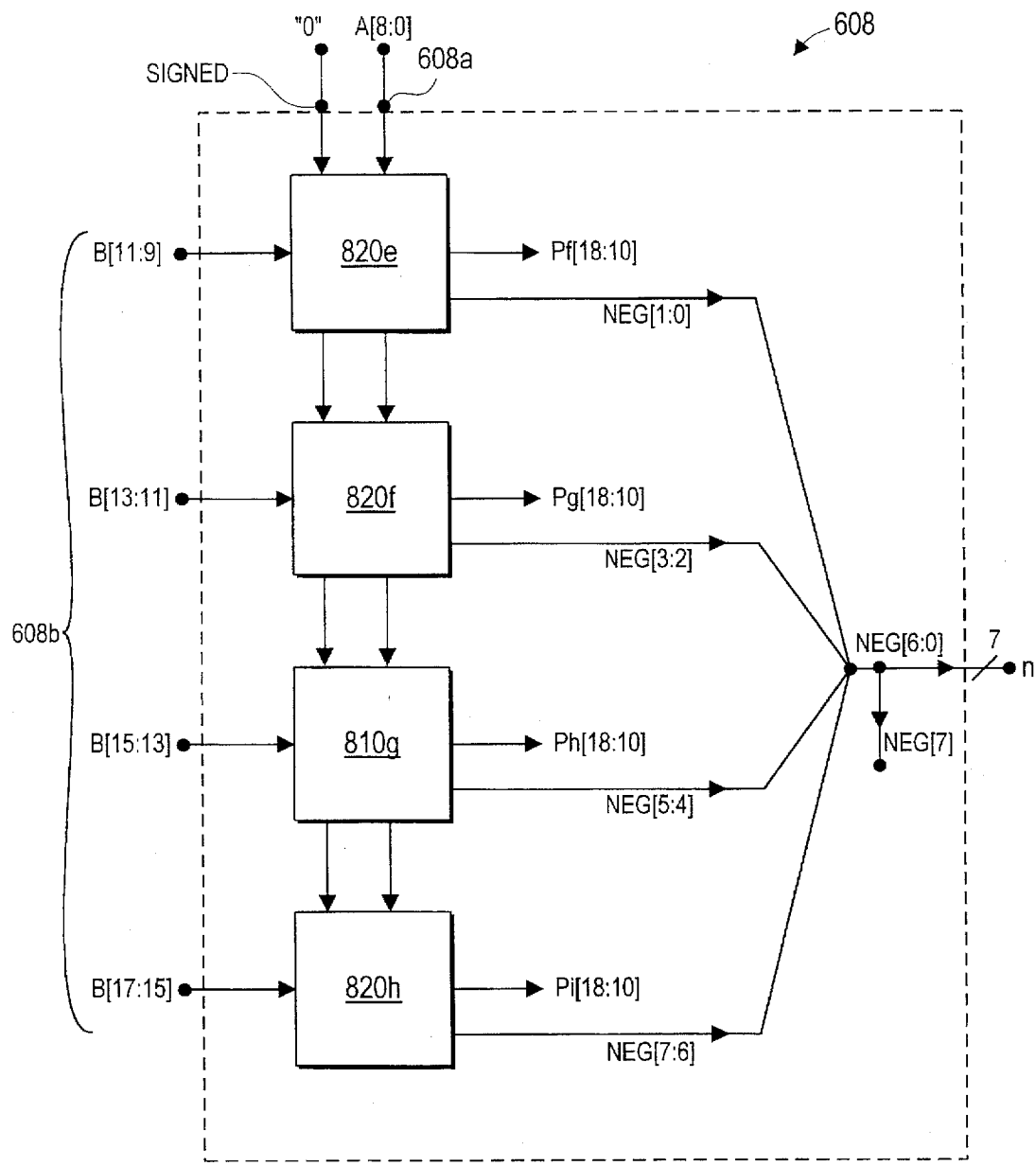

The structure of 9×8 multiplier 608 is identical to that of multiplier 606. Referring to FIG. 10d, the 10-bit signal A[8:0, "0"] provided to multiplier 608 at port 608a is provided to PPGs 812 via respective ports a[8:0] of each of rows 820e–820h. The first row 820e of PPGs 812 within multiplier 608 receives 3-bit input signal B[11:9] and, in a manner described above with reference to FIGS. 12 and 13, generates partial product Pf[8:0]. In a similar manner, rows 820f–820h of PPGs 812 within multiplier 608 generate partial products Pg[8:0]–Pi[8:0], respectively. The output of the MSB PPG 812 of each of rows 820e–820h within multiplier 608 is gated with a "0" via an XOR gate 816, thereby passing the output of the MSB PPG 812.

Referring to FIGS. 10d and 14, the negation string NEG provided at output port n of multiplier 608 is constructed in manner identical to that discussed above with respect to multiplier 606.

Thus, as explained above, multiplier 600 can selectably perform either one 18-bit signed multiplication or two 9-bit signed multiplications using only two 9×8 and two 9×10 multiplier circuits, thereby advantageously resulting in a savings of die area and hardware implementation cost.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

I claim:

1. A multiplier circuit comprising:

a first input port for receiving a first word having an upper byte and a lower byte;

a second input port for receiving a second word having an upper byte and a lower byte;

a first gating circuit coupled to receive the most-significant bit of said lower byte of said first word and a byte control signal, said first gating circuit providing a first bit at an output terminal thereof, said first bit being equal to the most significant bit of said lower byte of said first word when said byte control signal is in a first state and being equal to zero when said byte control signal is in a second state;

a first concatenation port coupled to receive said lower byte of said first word and said first bit and providing a sign-extended lower byte of said first word;

a second gating circuit coupled to receive the most-significant bit of said lower byte of said second word and said byte control signal, said second gating circuit providing a second bit at an output terminal thereof, said second bit being equal to the most significant bit of said lower byte of said second word when said byte control signal is in said first state and being equal to zero when said byte control signal is in said second state;

a second concatenation port coupled to receive said lower byte of said second word and said second bit and providing a sign-extended lower byte of said second word;

a first multiplier coupled to receive said sign-extended lower bytes of said first and second words and generating a first product equal to the product of said sign-extended lower bytes;

a third concatenation port coupled to said first input port and concatenating a zero bit with said upper byte of said first word to produce a left-shifted upper byte of said first word;

a fourth concatenation port coupled to said second input port and concatenating a zero bit with said upper byte of said second word to produce a left-shifted upper byte of said second word;

a second multiplier coupled to receive said left-shifted upper bytes of said first and second words and generating a second product equal to the product of said left-shifted upper bytes;

a third gating circuit coupled to receive said left-shifted upper byte of said first word and said byte control signal, said third gating circuit providing a first gated byte, said first gated byte being equal to said left-shifted upper byte of said first word when said byte control signal is in said second state and said first gated byte being equal to zero when said byte control signal is in said first state;

a fourth gating circuit coupled to receive said lower byte of said first word and said byte control signal, said fourth gating circuit providing a second gated byte, said second gated byte being equal to said lower byte of said first word when said byte control signal is in said second state and said second gated byte being equal to zero when said byte control signal is in said first state;

a third multiplier coupled to said second input port and to said third gating circuit, said third multiplier receiving said lower byte of said second word and said first gated byte and generating a third product equal to the product of said lower byte of said second word and said first gated byte; and a fourth multiplier coupled to said second input port and said fourth gating circuit, said fourth multiplier receiving said upper byte of said second word and said second gated byte and generating a fourth product equal to the product of said upper byte of said second word and said second gated byte.

2. The multiplier circuit of claim 1, further comprising a first summing circuit coupled to said first, second, third and fourth multipliers, said first summing circuit receiving said first, second, third and fourth products and generating a sum equal to the sum of said first, second, third and fourth products.

3. The multiplier circuit of claim 1, wherein said first and second words each have n bits and said upper and lower bytes each have n/2 bits.

4. The multiplier circuit of claim 3, wherein said first, second, third and fourth products all have 2*n bits.

5. A method of performing signed multiplication of a first word having an upper byte and a lower byte and a second word having an upper byte and a lower byte, said method comprising the steps of:

sign-extending, in a sign-extend circuit, said lower bytes of said first and second words to provide a first byte and a second byte, respectively;

multiplying, in a multiplier circuit, said first byte and said second byte to create a first product;

multiplying said upper byte of said first word with said upper byte of said second word to create a second product;

multiplying, in a multiplier circuit, said upper byte of said first word with a selectable signal to create a third byte;

multiplying, in a multiplier circuit, said lower byte of said first word with said selectable signal to create a fourth byte;

multiplying, in a multiplier circuit, said lower byte of said second word with said third byte to create a third product;

multiplying, in a multiplier circuit, the upper byte of said second word with said fourth byte to create a fourth product; and adding, in a summing circuit, said third and fourth products to create a first sum.

6. The method of claim 5, further comprising the step of setting said selectable signal to either one or zero.

7. The method of claim 5, further comprising the step of concatenating said first and second products to form a third word, wherein said first product forms the upper half of said third word and said second product forms the lower half of said third word.

8. The method of claim 7, further comprising the step of concatenating said first sum with a plurality of zeros before and after said first sum to create a fourth word.

9. The method of claim 8, further comprising the step of summing said third and fourth words.

10. A method of performing signed multiplication of a first word having an upper byte and a lower byte and a second word having an upper byte and a lower byte in either a byte mode of operation or a word mode of operation, said method comprising the steps of:

providing a selectable signal indicative of said byte mode of operation when in a first state and indicative of said word mode of operation when in a second state;

providing first and second bytes, said first and second bytes being equal to sign-extended lower bytes of said first and second words, respectively, when said selectable signal is in said first state and being equal to left-shifting each of said lower bytes of said first and second words by one bit, respectively, when said selectable signal is in said second state;

multiplying said first byte and said second byte to create a first product;

multiplying said upper byte of said first word with said upper byte of said second word to create a second product;

multiplying said upper byte of said first word with a selectable signal to create a third byte;

multiplying said lower byte of said first word with said selectable signal to create a fourth byte;

multiplying said lower byte of said second word with said third byte to create a third product;

multiplying the upper byte of said second word with said fourth byte to create a fourth product.

11. The method of claim 10 further comprising the steps of concatenating said first and second products to create a first sum, wherein said first product forms the upper half of said first sum and said second product forms the lower half of said first sum.

12. The method of claim 11 further comprising the step of adding said third and fourth products to create a second sum.

13. The method of claim 12 further comprising the step of combining said first sum and said second sum to produce a third word, wherein said third word equals the product of said first and second words when said selectable signal is in said second state, and wherein the lower half of said third word equals the product of said lower bytes of said first and second words and the upper half of said third word equals the product of said upper bytes of said first and second words when said selectable signal is in said first state.

* * * * *